United States Patent
Fukuda et al.

(10) Patent No.: US 12,462,422 B2
(45) Date of Patent: Nov. 4, 2025

(54) CALIBRATION METHOD AND CALIBRATION APPARATUS

(71) Applicant: Panasonic Intellectual Property Management Co., Ltd., Osaka (JP)

(72) Inventors: Masaki Fukuda, Osaka (JP); Toshiyasu Sugio, Osaka (JP); Toru Matsunobu, Osaka (JP); Satoshi Yoshikawa, Hyogo (JP); Tatsuya Koyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 470 days.

(21) Appl. No.: 17/370,402

(22) Filed: Jul. 8, 2021

(65) Prior Publication Data

US 2021/0335010 A1    Oct. 28, 2021

Related U.S. Application Data

(63) Continuation of application No. PCT/JP2020/001553, filed on Jan. 17, 2020.

(30) Foreign Application Priority Data

Jan. 24, 2019 (JP) .................................. 2019-010376

(51) Int. Cl.
*G06T 7/73* (2017.01)
*G06T 7/00* (2017.01)
(Continued)

(52) U.S. Cl.
CPC .................. *G06T 7/73* (2017.01); *G06T 7/80* (2017.01); *G06T 7/97* (2017.01); *G06V 10/147* (2022.01);
(Continued)

(58) Field of Classification Search
None
See application file for complete search history.

(56) References Cited

U.S. PATENT DOCUMENTS 9,875,431 B2 * 1/2018 Ikeda ...................... G06N 20/00
10,582,186 B1 * 3/2020 Baldwin .............. H04N 13/243
(Continued)

FOREIGN PATENT DOCUMENTS

AU    2009311052 A1 * 11/2010 ........... G06T 7/0097
CN    104333675 A   *  2/2015
(Continued)

OTHER PUBLICATIONS

International Search Report issued Mar. 31, 2020 in International (PCT) Application No. PCT/JP2020/001553.

*Primary Examiner* — Bernard Krasnic
(74) *Attorney, Agent, or Firm* — Wenderoth, Lind & Ponack, L.L.P.

(57) ABSTRACT

A calibration method of calibrating, using a processor, parameters of a plurality of imaging apparatuses that capture a common three-dimensional space, includes: obtaining images captured by the plurality of imaging apparatuses; obtaining the parameters of the plurality of imaging apparatuses; for each of the images, generating at least one search window to extract a plurality of feature points of the image using the parameters; for each of the images, extracting the plurality of feature points from an inside of the at least one search window; performing feature point matching between the images using the plurality of feature points; and calibrating the parameters based on a plurality of matching results obtained.

9 Claims, 23 Drawing Sheets

(51) Int. Cl.
  *G06T 7/80*      (2017.01)
  *G06V 10/147*   (2022.01)
  *G06V 10/46*    (2022.01)
  *G06V 10/50*    (2022.01)
  *G06V 10/75*    (2022.01)
  *G06V 20/52*    (2022.01)

(52) U.S. Cl.
  CPC ............ *G06V 10/462* (2022.01); *G06V 10/50* (2022.01); *G06V 10/757* (2022.01); *G06V 20/52* (2022.01)

(56) References Cited

U.S. PATENT DOCUMENTS

| | | | |
|---|---|---|---|
| 2011/0069889 A1 | 3/2011 | Morel et al. | |
| 2020/0077073 A1* | 3/2020 | Nash | G06T 7/593 |

FOREIGN PATENT DOCUMENTS

| | | | |
|---|---|---|---|
| CN | 105593901 A * | 5/2016 | ......... G06K 9/00778 |
| EP | 0831642 A2 * | 3/1998 | ............... H04N 5/14 |
| JP | 2011-521372 | 7/2011 | |
| JP | 2012-209895 | 10/2012 | |
| JP | 2017156988 A * | 9/2017 | |
| WO | 2009/150361 | 12/2009 | |

\* cited by examiner

CALIBRATION METHOD AND CALIBRATION APPARATUS

CROSS REFERENCE TO RELATED APPLICATIONS

This is a continuation application of PCT International Application No. PCT/JP2020/001553 filed on Jan. 17, 2020, designating the United States of America, which is based on and claims priority of Japanese Patent Application No. 2019-010376 filed on Jan. 24, 2019. The entire disclosures of the above-identified applications, including the specifications, drawings and claims are incorporated herein by reference in their entirety.

FIELD

The present disclosure relates to a calibration method and a calibration apparatus for calibrating parameters of a plurality of imaging apparatuses.

BACKGROUND

Patent Literature (PTL) 1 discloses a technique of performing projective transformation on a plurality of images captured by a camera by changing at least one of the position or the orientation of the camera, so as to perform matching between images that are significantly different in the way the same subject is viewed from the camera.

CITATION LIST

Patent Literature

PTL 1: Japanese Unexamined Patent Application Publication (Translation of PCT Application) No. 2011-521372

SUMMARY

A calibration method according to a first aspect of the present disclosure is a calibration method of calibrating, using a processor, parameters of a plurality of imaging apparatuses that capture a common three-dimensional space, the calibration method including: obtaining images captured by the plurality of imaging apparatuses; obtaining the parameters of the plurality of imaging apparatuses; for each of the images obtained, generating at least one search window to extract a plurality of feature points of the image using the parameters obtained; for each of the images obtained, extracting the plurality of feature points from an inside of the at least one search window generated; performing feature point matching between the images using the plurality of feature points extracted for each of the images; and calibrating the parameters based on a plurality of matching results obtained by the feature point matching.

A calibration method according to a second aspect of the present disclosure is a calibration method of calibrating, using a processor, parameters of a plurality of imaging apparatuses that capture a common three-dimensional space, the calibration method including: obtaining images captured by the plurality of imaging apparatuses; obtaining first parameters of the plurality of imaging apparatuses; estimating three-dimensional information in the common three-dimensional space based on the images obtained and the first parameters obtained; for each of the images obtained, calculating at least one search area for restricting combinations of feature points to be matched, based on the three-dimensional information estimated and the first parameters obtained; extracting a plurality of feature points for each of the images; by using the at least one search area calculated, narrowing down the plurality of feature points extracted to candidate feature points to be matched in feature point matching, and performing the feature point matching between the images using the candidate feature points; and calibrating the parameters of the plurality of imaging apparatuses based on a plurality of matching results obtained by the feature point matching.

A calibration method according to a third aspect of the present disclosure is a calibration method of calibrating, using a processor, parameters of a plurality of imaging apparatuses that capture a common three-dimensional space, the calibration method including: obtaining images captured by the plurality of imaging apparatuses; for each of the images obtained, generating a search window surrounding a shape of an object in the image; for each of the images obtained, extracting a plurality of feature points from an inside of the search window generated; performing feature point matching between the images using the plurality of feature points extracted for each of the images; and calibrating the parameters based on a plurality of matching results obtained by the feature point matching.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
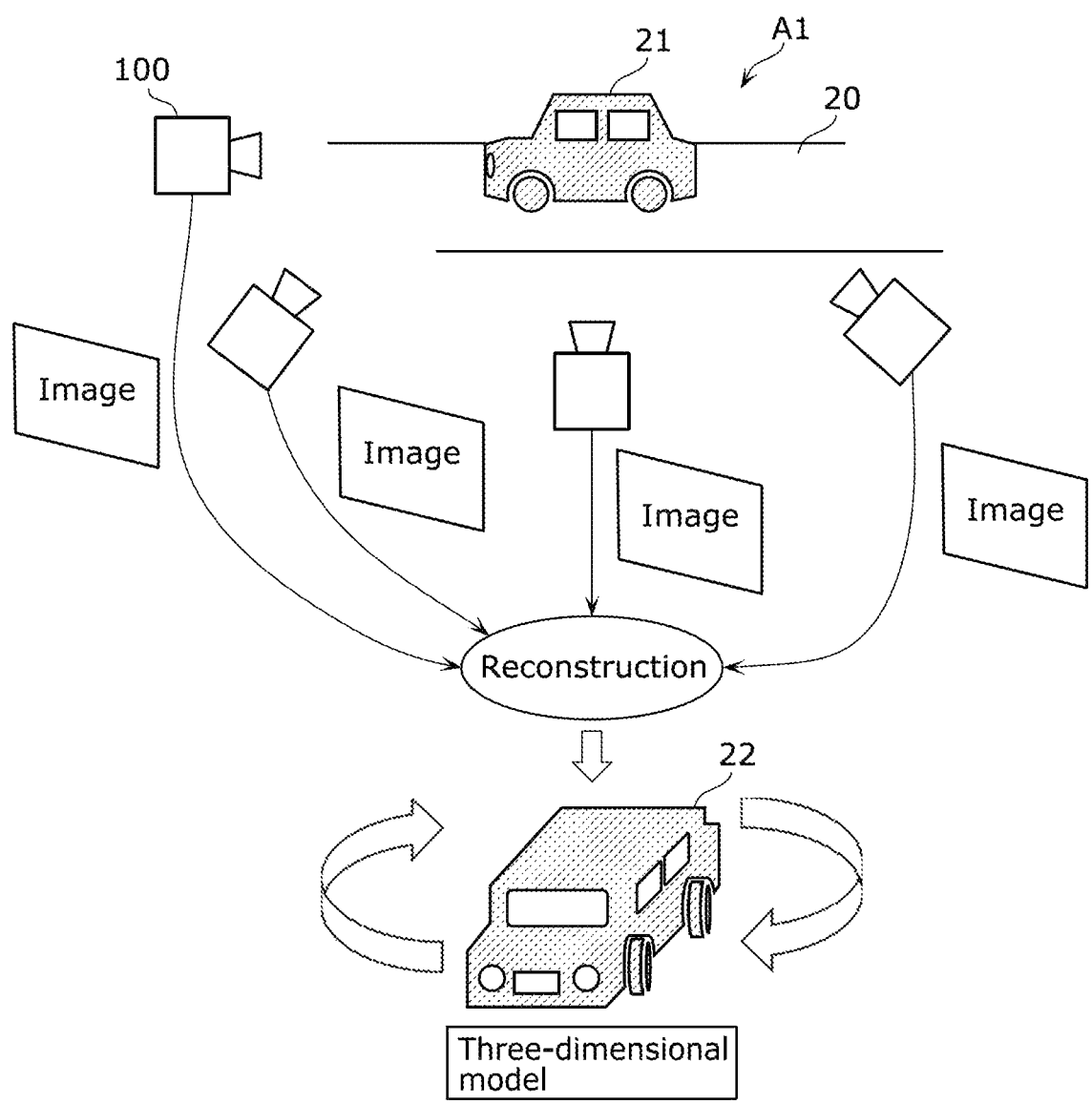
FIG. 1 illustrates an overview of three-dimensional space recognition.

DESCRIPTION OF EMBODIMENTS (Underlying Knowledge Forming Basis of the Present Disclosure Three-dimensional space recognition is achieved by reconstructing (modeling) a three-dimensional shape of a subject or by using a reconstruction result. A three-dimensional space reconstruction apparatus that reconstructs a three-dimensional shape of a subject performs modeling by using video data provided from an imaging system that includes a plurality of cameras that capture videos of the same scene, and camera parameters obtained by calibration that indicate, for instance, positions and orientations of the cameras (hereinafter each referred to as a "position orientation"). Accordingly, if the position of a camera, for example, is changed after calibration, a camera parameter does not reflect the actual state of the position of the camera, for example, and thus the three-dimensional shape of the subject cannot be appropriately reconstructed. As a result, the accuracy of three-dimensional space recognition deteriorates, or even generation of the three-dimensional shape of the subject fails. Accordingly, it is necessary to periodically calibrate parameters of cameras.

In such an imaging system, a plurality of cameras are disposed to surround a predetermined space. Thus, when two of the plurality of cameras are significantly different in position orientation, the ways a subject in the predetermined space is viewed from the two cameras are significantly different. Consequently, when camera parameters of the plurality of cameras are to be calibrated, it is difficult to extract feature points unique to positions recognized as the same point in the three-dimensional space, thus making it difficult to accurately calibrate the parameters. Furthermore, although the conventional technique disclosed in PTL 1 increases the matching accuracy by extracting feature points after transforming images such that the ways a subject is viewed from a camera become approximately the same, it requires high load processing.

As indicated above, the conventional technique cannot readily calibrate parameters of a plurality of imaging apparatuses.

In view of the above, a calibration method according to a first aspect of the present disclosure is a calibration method of calibrating, using a processor, parameters of a plurality of imaging apparatuses that capture a common three-dimensional space, the calibration method including: obtaining images captured by the plurality of imaging apparatuses; obtaining the parameters of the plurality of imaging apparatuses; for each of the images obtained, generating at least one search window to extract a plurality of feature points of the image using the parameters obtained; for each of the images obtained, extracting the plurality of feature points from an inside of the at least one search window generated; performing feature point matching between the images using the plurality of feature points extracted for each of the images; and calibrating the parameters based on a plurality of matching results obtained by the feature point matching.

According to this, the extraction of a plurality of feature points, which is performed for the feature point matching between the images, is performed using at least one search window generated using the parameters of the plurality of imaging apparatuses. This makes it possible to extract feature points from the images, considering that the images are results of image capturing performed at different positions. This makes it possible to increase the matching accuracy while reducing the matching processing load. Accordingly, it is possible to accurately calibrate the parameters of the plurality of imaging apparatuses.

Each of the parameters may be related to a position orientation of a corresponding imaging apparatus that corresponds to the parameter, obtained by calibration performed on the corresponding imaging apparatus at a past point in time, and include a camera label that identifies the corresponding imaging apparatus.

Thus, by performing the calibration using the parameters obtained in the past, it is possible to efficiently calibrate the parameters of the plurality of imaging apparatuses.

Each of the parameters may be related to a position orientation of a corresponding imaging apparatus that corresponds to the parameter, related to a relative position orientation of the corresponding imaging apparatus relative to an other imaging apparatus, and include a camera label that identifies the corresponding imaging apparatus.

Thus, by performing the calibration using the parameters related to a position orientation of a target imaging apparatus relative to another imaging apparatus, it is possible to efficiently calibrate the parameters of the plurality of imaging apparatuses.

Each of the parameters may be related to a position orientation of a corresponding imaging apparatus that corresponds to the parameter, indicate a distance from the corresponding imaging apparatus to a given point in the common three-dimensional space, and include a camera label that identifies the corresponding imaging apparatus.

Thus, by performing the calibration using the parameters each indicating a distance from a target imaging apparatus to a given point in the three-dimensional space, it is possible to efficiently calibrate the parameters of the plurality of imaging apparatuses.

The generating of the at least one search window may include calculating, based on the parameters, a search window having a shape that increases in length in a direction substantially perpendicular to an arrangement direction of one imaging apparatus that has captured the image and an other imaging apparatus with an increase in difference in position orientation between the one imaging apparatus and the other imaging apparatus in the arrangement direction.

This makes it possible to calculate a search window according to the imaging apparatus that has captured the image, and effectively extract feature points from the images.

The extracting of the plurality of feature points may include (i) detecting a plurality of keypoints from the image, and (ii) for each of the plurality of keypoints detected, (ii-i) extracting at least one feature amount patch by placing the at least one search window on the image such that a center of the at least one search window is located on the keypoint, and (ii-ii) extracting a feature point by calculating, as a feature amount, a feature distribution of each of the at least one feature amount patch extracted for the keypoint and writing the feature distribution in the keypoint.

This makes it possible to extract a plurality of feature points including feature amounts according to the parameters of the plurality of imaging apparatuses.

A calibration method according to another aspect of the present disclosure is a calibration method of calibrating, using a processor, parameters of a plurality of imaging apparatuses that capture a common three-dimensional space, the calibration method including: obtaining images captured by the plurality of imaging apparatuses; obtaining first parameters of the plurality of imaging apparatuses; estimating three-dimensional information in the common three-dimensional space based on the images obtained and the first parameters obtained; for each of the images obtained, calculating at least one search area for restricting combinations of feature points to be matched, based on the three-dimensional information estimated and the first parameters obtained; extracting a plurality of feature points for each of the images; by using the at least one search area calculated, narrowing down the plurality of feature points extracted to candidate feature points to be matched in feature point matching, and performing the feature point matching between the images using the candidate feature points; and calibrating the parameters of the plurality of imaging apparatuses based on a plurality of matching results obtained by the feature point matching.

According to this, using at least one search area generated based on the second parameters that include the three-dimensional information, the plurality of feature points extracted are narrowed down to candidate feature points to be matched, and then the feature point matching is performed using the candidate feature points. Thus, the matching accuracy can be increased and the feature point matching can be performed efficiently. This makes it possible to accurately calibrate the parameters of the plurality of imaging apparatuses.

Each of the first parameters may be related to a position orientation of a corresponding imaging apparatus that corresponds to the first parameter, obtained by calibration performed on the corresponding imaging apparatus at a past point in time, and include a camera label that identifies the corresponding imaging apparatus.

Thus, by performing the calibration using the parameters obtained in the past, it is possible to efficiently calibrate the parameters of the plurality of imaging apparatuses.

At least one first search area that is the at least one search area in a first image included in the images and at least one second search area that is the at least one search area in a second image included in the images may correspond to at least one area in the common three-dimensional space, and the narrowing down may include narrowing down to, as the candidate feature points to be matched in the feature point matching, at least one first feature point included in one first search area among the at least one first search area and at least one second feature point included in one second search area among the at least one second search area, and the performing of the feature point matching may include performing the feature point matching using the at least one first feature point and the at least one second feature point, the one first search area and the one second search area being areas that correspond to a common area in the common three-dimensional space.

According to this, an association is made between at least one first feature point included in a first search area in the first image and at least one second feature point included in a second search area in the second image, and the first search area and the second search area correspond to a common area in the three-dimensional space. Thus, the matching accuracy can be increased and the feature point matching can be performed efficiently.

In the performing of the feature point matching, the feature point matching may be not performed using the at least one first feature point and a feature point other than the at least one second feature point in the second image, and the feature point matching may be not performed using the at least one second feature point and a feature point other than the at least one first feature point in the first image.

According to this, since the feature point matching is not performed between areas that do not correspond to a common area in the three-dimensional space, the matching accuracy can be increased, and the feature point matching can be performed efficiently.

A calibration method according to another aspect of the present disclosure is a calibration method of calibrating, using a processor, parameters of a plurality of imaging apparatuses that capture a common three-dimensional space, the calibration method including: obtaining images captured by the plurality of imaging apparatuses; for each of the images obtained, generating a search window surrounding a shape of an object in the image; for each of the images obtained, extracting a plurality of feature points from an inside of the search window generated; performing feature point matching between the images using the plurality of feature points extracted for each of the images; and calibrating the parameters based on a plurality of matching results obtained by the feature point matching. In this calibration method, since the feature point matching is performed using a search window surrounding the shape of an object, the matching accuracy is increased while the matching processing load is reduced.

Note that these general and specific aspects may be implemented using a system, an apparatus, an integrated circuit, a computer program, a computer-readable recording medium such as a compact disc read-only memory (CD-ROM), or any combination of systems, apparatuses, integrated circuits, computer programs, and recording media.

Hereinafter, a calibration system and a calibration method according to an aspect of the present disclosure are specifically described with reference to the drawings.

Note that the embodiments described below each indicate a specific example of the present disclosure. The numerical values, shapes, materials, elements, the arrangement and connection of the elements, steps, the processing order of the steps, etc. described in the following embodiments are mere examples, and thus are not intended to limit the present disclosure. Among the elements in the following embodiments, those not recited in any of the independent claims defining the broadest inventive concepts are described as optional elements.

Hereinafter, Embodiment 1 is described with reference to the drawings.

Embodiment 1

[1. Overview of Three-Dimensional Space Recognition and Calibration]

First, an overview of three-dimensional space recognition and calibration which use a calibration system according to the present embodiment is described with reference to FIG.

Figure 2:
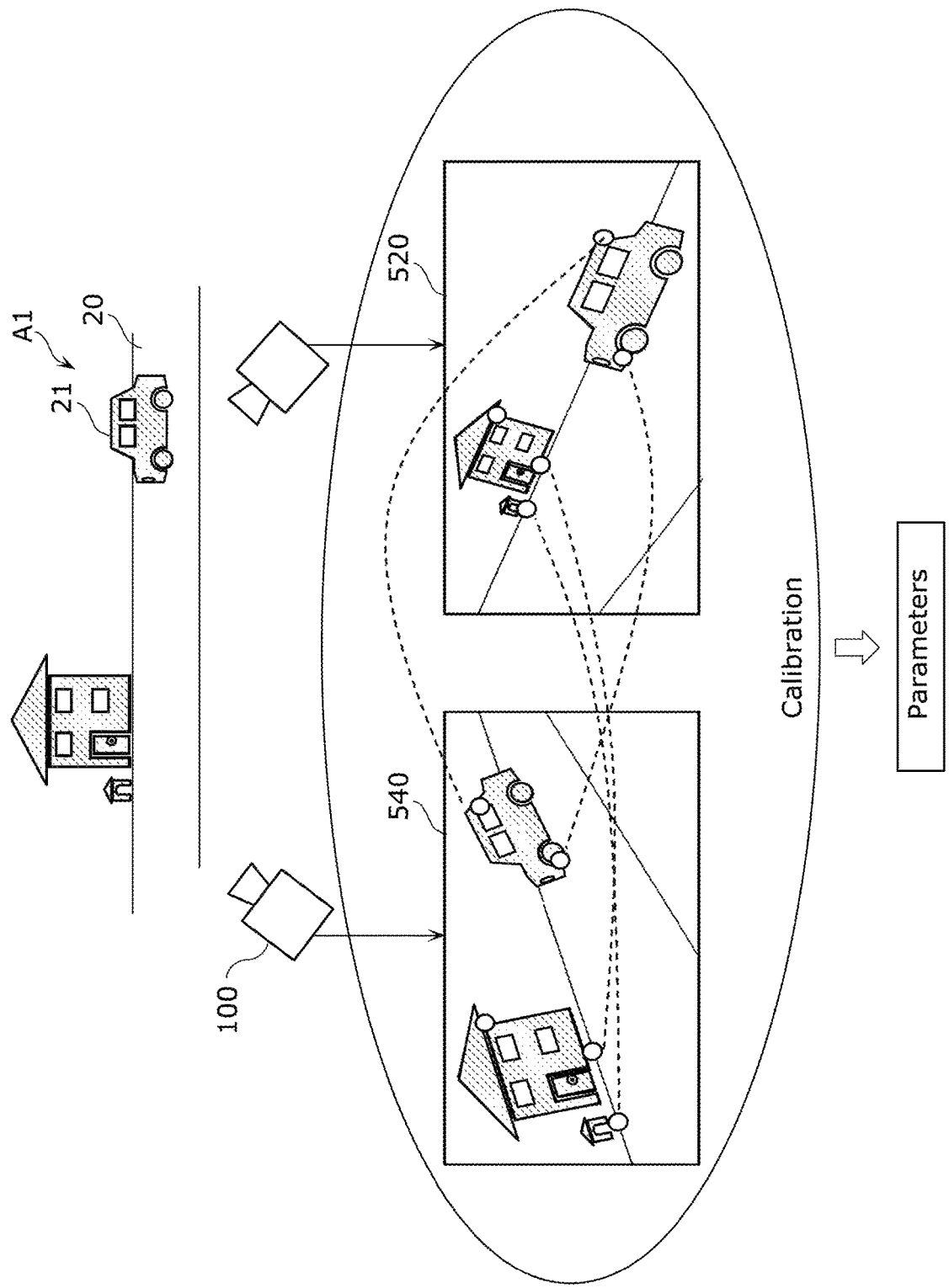
FIG. 2 illustrates an overview of calibration.

1 and FIG. 2. FIG. 1 illustrates an overview of three-dimensional space recognition. FIG. 2 illustrates an overview of calibration.

The calibration system includes a plurality of cameras 100 for capturing the same scene in predetermined three-dimensional space A1 (hereinafter also referred to as "space A1"). To give a specific example, predetermined three-dimensional space A1 is a space on a road, and the same scene is a scene in which vehicle 21 is traveling on road 20 or in which a pedestrian (not illustrated) is present. To give another example, predetermined three-dimensional space A1 is a three-dimensional space in which a monitoring target is present, and the same scene is a motion of a person or an object.

The plurality of cameras 100 are disposed in different positions, and capture a common three-dimensional space. Thus, imaging target areas, in the three-dimensional space, of the plurality of cameras 100 include areas that at least partially overlap. For example, the plurality of cameras 100 are disposed in different positions in a way that the plurality of cameras 100 surround part of space A1 on road 20. Also, the plurality of cameras 100 are different in orientation. The imaging target areas of the plurality of cameras 100 at least partially overlap. The imaging target areas need to at least partially overlap so as to reconstruct, in a three-dimensional space, video data obtained by image capturing and to use the video data in the matching performed in camera calibration. Note that the imaging target areas may overlap among some of cameras 100 or among all cameras 100.

In three-dimensional space recognition, three-dimensional model 22 is reconstructed using a plurality of videos (hereinafter, videos are also referred as images) obtained from the plurality of cameras 100 disposed in the above-described manner and parameters indicating the position orientations of the plurality of cameras 100. In view of this, calibration is necessary for the plurality of cameras 100 in order to obtain parameters. As illustrated in FIG. 2, in the calibration, parameters of cameras 100 are calculated by extracting characteristic points in the videos captured by cameras 100, and matching the extracted characteristic points between images 520 and 540 having different viewpoints, as indicated by the dotted lines in FIG. 2. The characteristic points are points shown by white circles in images 520 and 540 in FIG. 2. The parameters calculated here are camera parameters indicating, for example, the positions and the angles of the imaging directions (orientations) of cameras 100 in a common coordinate system. Note that the position orientations of cameras 100 are also referred to as camera poses.

Data on three-dimensional model 22 obtained by the reconstruction is transmitted to an apparatus that performs three-dimensional space recognition. The functions of three-dimensional space recognition performed by such an apparatus include three-dimensional object recognition, object shape/motion analysis, and free-viewpoint video generation, for example.

The three-dimensional object recognition is processing of identifying what type of object is present and where the object is present in a three-dimensional space. The three-dimensional object recognition is processing of calculating the position of vehicle 21 in space A1, the distance from a building to a pedestrian in space A1, etc. with use of, for example, a three-dimensional model reconstructed using a plurality of videos of space A1 on road 20. These calculation results are used for detecting a vehicle position for automated driving, for example.

The object shape/motion analysis is processing of analyzing an object's shape, size in the real space, motion speed, etc. The object shape/motion analysis is processing of calculating the size and the traveling speed of vehicle 21 or the height and the traveling speed of a pedestrian, etc., with use of, for example, a three-dimensional model reconstructed using a plurality of videos of space A1 on road 20. In addition, the object shape/motion analysis may calculate the position in space A1, size, traveling speed etc., of vehicle 21 by combining with the calculation result of the three-dimensional object recognition.

The free-viewpoint video generation is processing of generating a video viewed from a virtual viewpoint that is a viewpoint at which no camera is present. The free-viewpoint video generation is processing of, for example, using three-dimensional model 22 reconstructed using a plurality of videos of space A1 on road 20 in which vehicle 21 is captured from a plurality of mutually different oblique directions, so as to generate a virtual-viewpoint video as though vehicle 21 has been captured from the front direction not included in the plurality of oblique directions.

As described above, these functions of the three-dimensional space recognition are implemented based on a three-dimensional model generated using a plurality of videos captured at a plurality of different viewpoints. To implement each function with high accuracy, a more accurate three-dimensional model is necessary. To reconstruct a more accurate three-dimensional model, more accurate camera parameters are necessary. If the camera parameters are not accurate, the reconstructed three-dimensional model deteriorates in accuracy, or the three-dimensional model cannot be reconstructed. Deterioration in the accuracy of three-dimensional model data causes deterioration in the accuracy of three-dimensional space recognition. Also, incapability to reconstruct three-dimensional model data makes it difficult to implement three-dimensional space recognition.

The following describes a calibration system capable of calculating more accurate camera parameters.

[2. Configuration of Calibration System]

Figure 3:
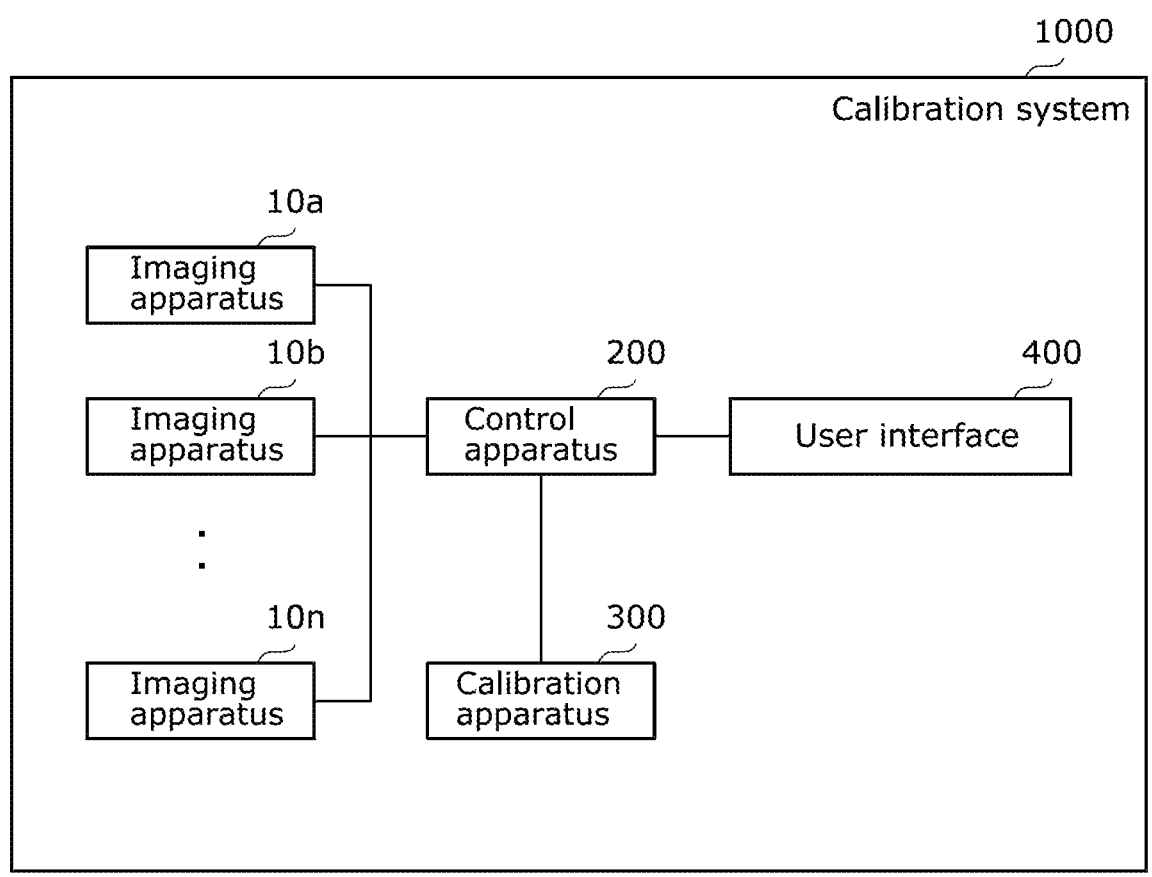
FIG. 3 is a block diagram illustrating a configuration of a calibration system according to Embodiment 1.

FIG. 3 is a block diagram illustrating a configuration of the calibration system according to Embodiment 1.

Calibration system 1000 according to Embodiment 1 includes a plurality of imaging apparatuses 10a to 10n, control apparatus 200, calibration apparatus 300, and user interface 400. Imaging apparatuses 10a to 10n are communicatively connected with control apparatus 200. Calibration apparatus 300 and user interface 400 are also communicatively connected with control apparatus 200.

[2-1. Configuration of Imaging Apparatuses]

Figure 4:
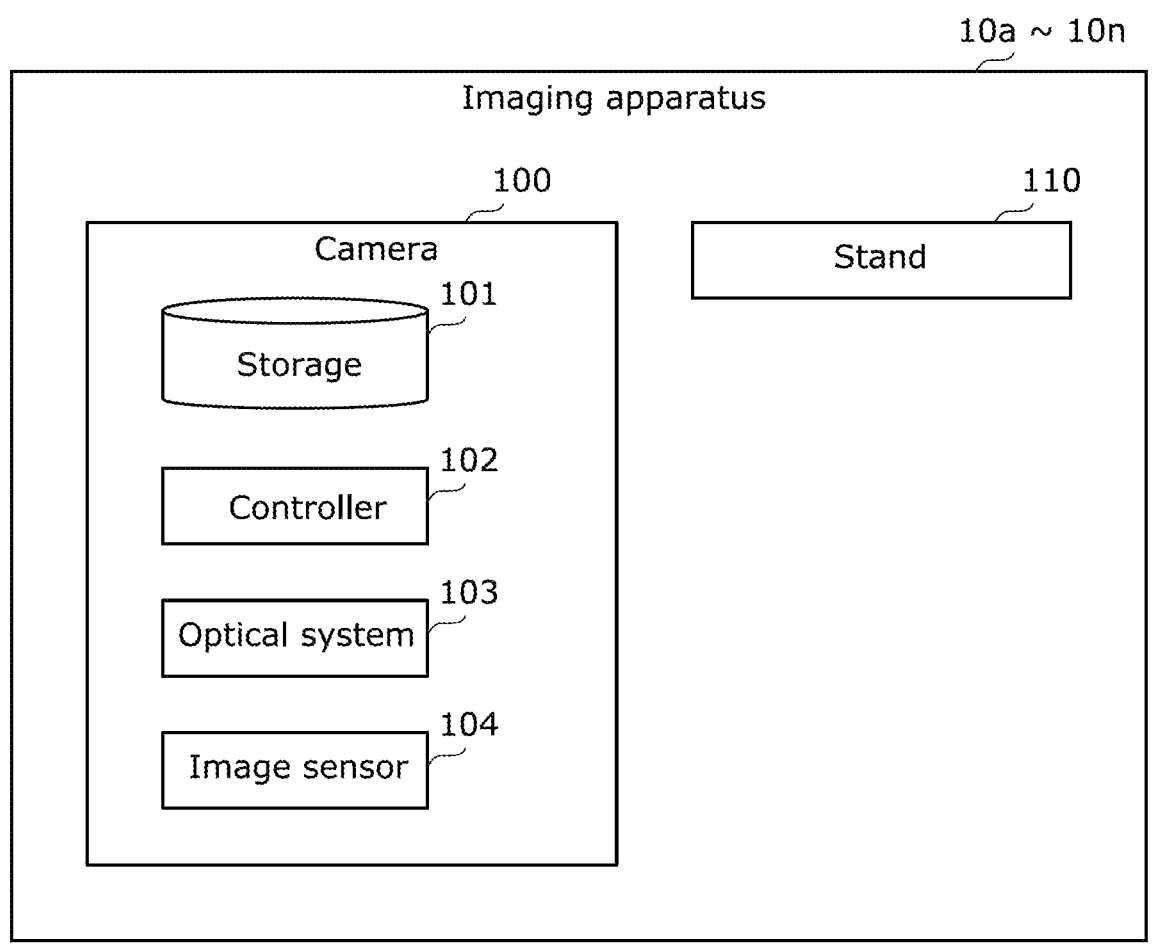
FIG. 4 is a block diagram illustrating a configuration of imaging apparatuses according to Embodiment 1.

FIG. 4 is a block diagram illustrating a configuration of imaging apparatuses 10a to 10n according to Embodiment 1.

Imaging apparatuses 10a to 10n are apparatuses each including a camera for capturing predetermined space A1, which is equivalent to camera 100 illustrated in FIG. 1, and possible configurations of imaging apparatuses 10a to 10n are the same. The term "predetermined space A1" used here is a union of imaging areas of the plurality of cameras.

Each of imaging apparatuses 10a to 10n includes camera 100 and stand 110. Hereinafter, since imaging apparatuses 10a to 10n have the same configuration, description focuses on imaging apparatus 10a when one imaging apparatus according to the present disclosure is to be described. Thus, the following description of imaging apparatus 10a also applies to other imaging apparatuses 10b to 10n.

Camera 100 includes storage 101, controller 102, optical system 103, and image sensor 104.

Storage 101 stores a program that is read and executed by controller 102. Storage 101 temporarily stores video data on an imaging area captured using image sensor 104, meta information such as a time stamp that is to be attached to the video data, a camera parameter of camera 100, and imaging settings such as a frame rate or a resolution that is being applied.

Such storage 101 is implemented by use of a rewritable, nonvolatile semiconductor memory such as a flash memory. In addition, a read-only memory (ROM), which is non-rewritable, or a random access memory (RAM), which is volatile, can be used as a storage according to whether data to be stored needs to be overwritten, how long the data has to be stored, or the like.

The number of imaging apparatuses included in calibration system 1000 is not limited as long as more than one imaging apparatus is included. In addition, imaging apparatuses 10a to 10n need not have common properties. Also, cameras 100 included in imaging apparatuses 10a to 10n are not limited to monaural cameras and may include stereo cameras.

Note that although calibration system 1000 includes a plurality of imaging apparatuses, the present disclosure is not limited to this, and may include one imaging apparatus. For example, calibration system 1000 may cause one imaging apparatus to capture an imaging target in a real space while causing the imaging apparatus to move so that a multi-view image including a plurality of images of different viewpoints is generated. The plurality of images are images captured (generated) by the imaging apparatuses that are different in at least one of position or orientation.

Controller 102 is implemented by, for example, use of a central processing unit (CPU) and reads and executes the program stored in storage 101 described above to control elements included in camera 100, thus allowing the imaging function and other functions to be carried out. Note that controller 102 may be implemented by a dedicated circuit that controls the elements included in camera 100, to allow the imaging function and other functions to be carried out. In other words, controller 102 may be implemented by software or by hardware.

Optical system 103 is an element by which light from an imaging area is formed into an image on image sensor 104, and is implemented by use of optical elements including a lens. The focal distance and the angle of view of optical system 103 may be changeable. A wide-angle lens or a super-wide-angle lens such as a fisheye lens may be used. For example, when videos captured by calibration system 1000 are used in a monitoring system, wide-angle lenses may be used to expand an imaging area.

Image sensor 104 is implemented by a solid-state image sensor that receives light collected by the optical system with its light receiving surface and converts the received light into an electric signal representing an image, such as a charge-coupled-device (CCD) image sensor, a complementary metal-oxide-semiconductor (CMOS) image sensor, and a metal-oxide-semiconductor (MOS) image sensor.

Stand 110 is an element that fixes and supports the camera in a predetermined position while the camera is generating a video to be used for calibration by imaging, and is implemented by, for example, a tripod. Note that the length and the angle of the leg(s) of stand 110 may be adjustable in order to adjust a fixing position of camera 100 as preparation for the imaging. Stand 110 may include a mechanism to rotate the pan head in order to pan or tilt camera 100, an elevating mechanism to move camera 100 vertically, and the like. Alternatively, stand 110 may include a mechanism to support and move camera 100, such as a dolly and a crane.

[2-2. Configuration of Control Apparatus]

Figure 5:
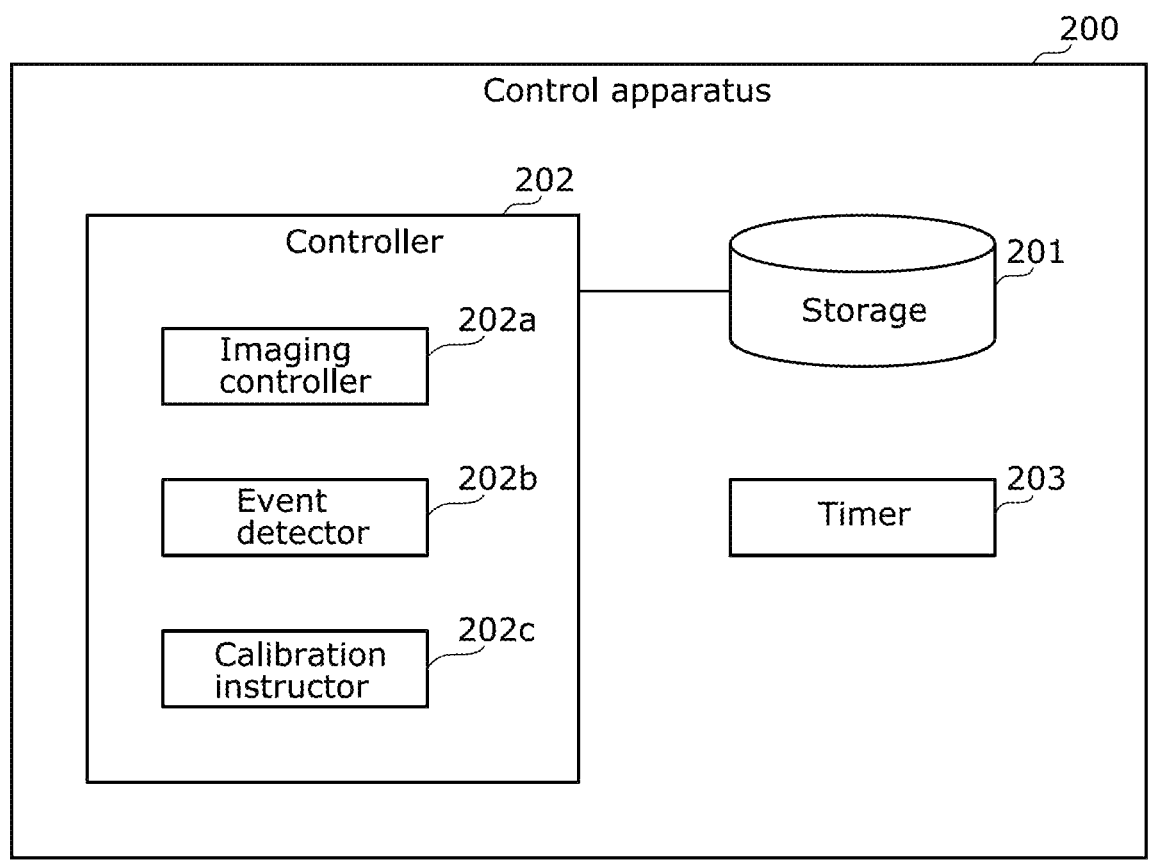
FIG. 5 is a block diagram illustrating a configuration of a control apparatus according to Embodiment 1.

FIG. 5 is a block diagram illustrating a configuration of control apparatus 200 according to Embodiment 1.

Control apparatus 200 includes storage 201, controller 202, and timer 203.

Control apparatus 200 controls imaging apparatuses 10a to 10n, and processes data received from imaging apparatuses 10a to 10n. Control apparatus 200 instructs calibration apparatus 300 to perform calibration processing on camera parameters of cameras 100 included in imaging apparatuses 10a to 10n.

An example of control apparatus 200 is a computer. In this case, storage 201 is a storage apparatus of the computer and is implemented by a hard disk drive, a semiconductor memory of any of various kinds, or a combination thereof. Controller 202 is implemented by a CPU of the computer, and timer 203 is a timer included in the computer and referred to by the CPU. User interface 400 is implemented by a display apparatus, a touch screen, a track pad, a keyboard, a mouse, or other kinds of controllers, which are connected to the computer, or a combination thereof.

Storage 201 stores a program that is read and executed by controller 202. Storage 201 stores data that is received from imaging apparatuses 10a to 10n and is to be processed by controller 202.

Controller 202 reads and executes the program stored in storage 201 described above, so as to control imaging apparatuses 10a to 10n described above and calibration apparatus 300. Further, controller 202 performs processes in response to a user instruction related to the above control and processing. One of the processes is the control on capturing synchronized videos by cameras 100 included in imaging apparatuses 10a to 10n.

In addition, event detection and calibration instruction may each be included as one of the processes. Event detector 202b included in controller 202 is a functional element that is implemented by controller 202 executing a program for event detection. Further, calibration instructor 202c included in controller 202 is a functional element that is implemented by controller 202 executing a program for calibration instruction.

Note that imaging controller 202a, event detector 202b, and calibration instructor 202c of controller 202 may be implemented by dedicated circuits that allow, for instance, imaging control, event detection, calibration instruction, and calibration processing to be carried out. In other words, controller 202 may be implemented by software or by hardware.

Imaging controller 202a causes imaging apparatuses 10a to 10n to capture three-dimensional space A1 that is the imaging area, at different times. Imaging controller 202a causes imaging apparatuses 10a to 10n to capture the imaging area in a state in which imaging apparatuses 10a to 10n are located in predetermined positions and oriented in predetermined directions.

Event detector 202b detects occurrence of a predetermined event that can be a reason for performing the calibration on one or more of cameras 100 included in imaging apparatuses 10a to 10n, based on imaging circumstance information provided from imaging apparatuses 10a to 10n. An event that can be a reason for performing the calibration is, for example, an event that causes a camera to move or is highly likely to cause a camera to move, or an event that is highly likely to allow matching to be performed with high accuracy. More specific examples will be described later in description of the operation of calibration system 1000. When occurrence of such an event is detected, event detector 202b determines whether to perform the calibration. When it is determined to perform the calibration, event detector 202b outputs calibration information that indicates calibration to be performed, to calibration instructor 202c, for example.

Calibration instructor 202c causes calibration to be performed on camera 100 indicated by the calibration information, based on the calibration information received from event detector 202b. If the number of cameras 100 indicated by the calibration information is two or more, the order of calibration performed on cameras 100 may be determined based on, for example, details of the event which is the reason for performing the calibration indicated by the calibration information. A specific example of processing performed by calibration instructor 202c will be described later.

[2-3. Configuration of Calibration Apparatus]

Figure 6:
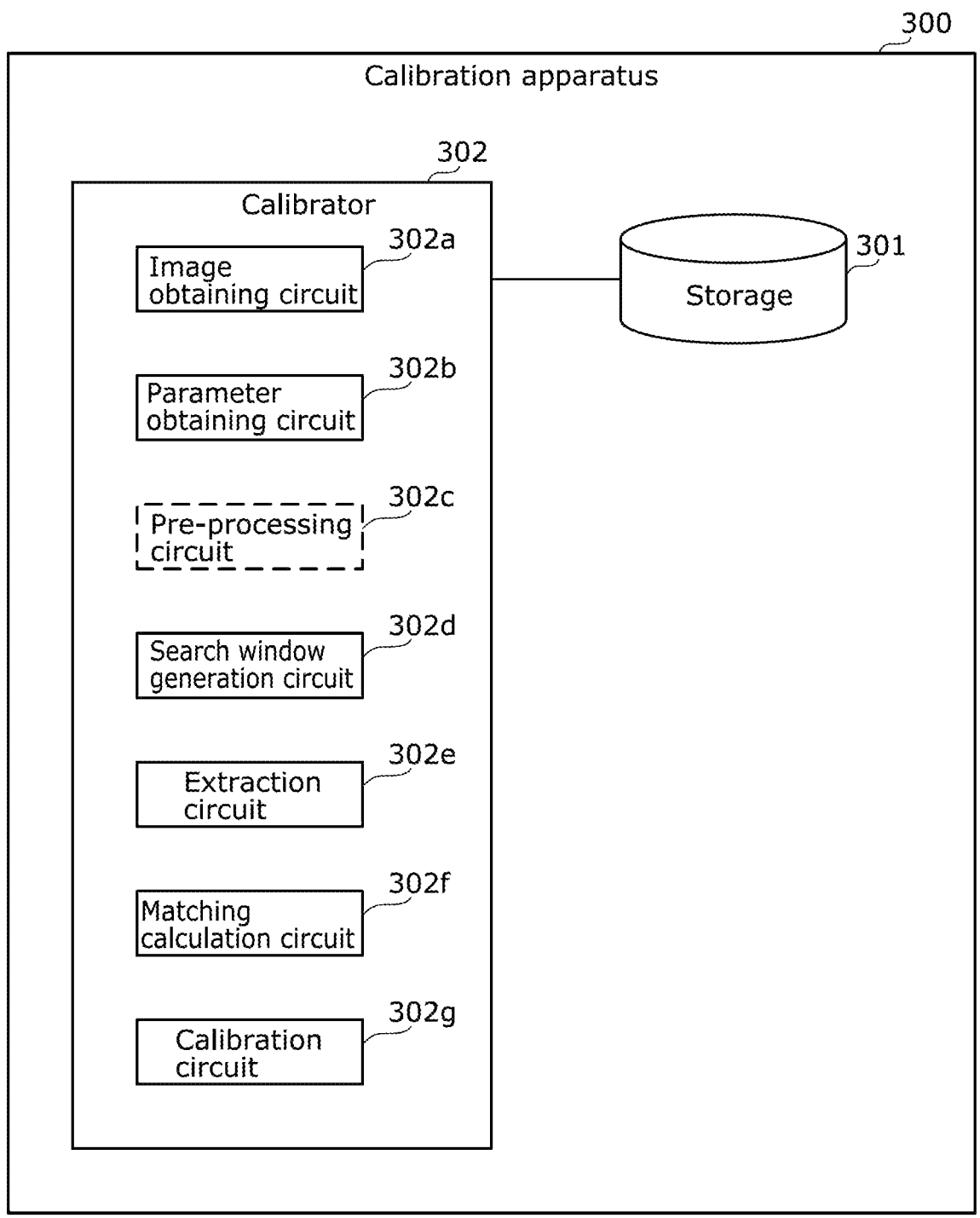
FIG. 6 is a block diagram illustrating a configuration of a calibration apparatus according to Embodiment 1.

FIG. 6 is a block diagram illustrating a configuration of calibration apparatus 300 according to Embodiment 1.

Calibration apparatus 300 includes storage 301 and calibrator 302.

Calibration apparatus 300 processes data received via control apparatus 200. Specifically, calibration apparatus 300 performs calibration processing on camera parameters of cameras 100 included in imaging apparatuses 10a to 10n. In addition, calibration apparatus 300 may perform three-dimensional space reconstruction processing.

An example of calibration apparatus 300 is a computer. In this case, storage 301 is a storage apparatus of the computer and is implemented by a hard disk drive, a semiconductor memory of any of various kinds, or a combination thereof. Calibrator 302 is implemented by a CPU of the computer. Note that calibration apparatus 300 may be implemented by the same computer as that of control apparatus 200.

Storage 301 stores a program that is read and executed by calibrator 302. Storage 301 stores data that is received from imaging apparatuses 10a to 10n via control apparatus 200 and is to be processed by calibrator 302, and data that is related to imaging apparatuses 10a to 10n obtained from an external apparatus and is to be processed by calibrator 302. Specifically, imaging circumstance information may be stored, or parameter information related to camera parameters of imaging apparatuses 10a to 10n may be stored.

Calibrator 302 reads and executes the program stored in storage 301 described above to perform processes on the above-described data received from imaging apparatuses 10a to 10n. One of the processes is calibration processing performed on camera parameters of cameras 100 included in imaging apparatuses 10a to 10n.

Here, the calibration processing performed by calibration apparatus 300 is described with reference to FIG. 7A to FIG. 7F and FIG. 8 to FIG. 11. FIG. 7A to FIG. 7F are diagrams for describing examples of parameter information. FIG. 8 to FIG. 11 are diagrams for describing details of calibration processing.

Calibrator 302 includes image obtaining circuit 302a, parameter obtaining circuit 302b, pre-processing circuit 302c, search window generation circuit 302d, extraction circuit 302e, matching calculation circuit 302f, and calibration circuit 302g.

Image obtaining circuit 302a obtains a plurality of images captured by imaging apparatuses 10a to 10n. Image obtaining circuit 302a further obtains, with the images, camera labels each corresponding to a different one of the images and indicating camera 100 that has captured the image. For example, image obtaining circuit 302a may obtain the plurality of images and the camera labels by obtaining images to which camera labels have been assigned. Each of the images may be a still image, or may be a moving image. Note that the images used for the calibration processing may each be an image captured by a different one of the plurality of imaging apparatuses 10a to 10n at a corresponding time. The plurality of images obtained by image obtaining circuit 302a are stored in storage 301. Image obtaining circuit 302a may store the images and the camera labels in storage 301 in advance, prior to receiving a calibration instruction from control apparatus 200. This allows calibration apparatus 300 to start the calibration processing when calibration is determined to be necessary. In other words, calibration apparatus 300 can start the calibration processing without having to newly obtain images and camera labels.

Parameter obtaining circuit 302b obtains parameter information related to the parameters of imaging apparatuses 10a to 10n from an apparatus outside calibration system 1000 or from storage 301. Parameter obtaining circuit 302b further obtains, with plural items of parameter information, camera labels each corresponding to a different one of the plural items of parameter information and indicating an imaging apparatus corresponding to the item of parameter information. For example, parameter obtaining circuit 302b may obtain the plural items of parameter information and the camera labels by obtaining plural items of parameter information to which the camera labels have been assigned. Each of the plural items of parameter information is information related to the position orientation of camera 100 included in the imaging apparatus corresponding to the item of parameter information.

Figure 7A:
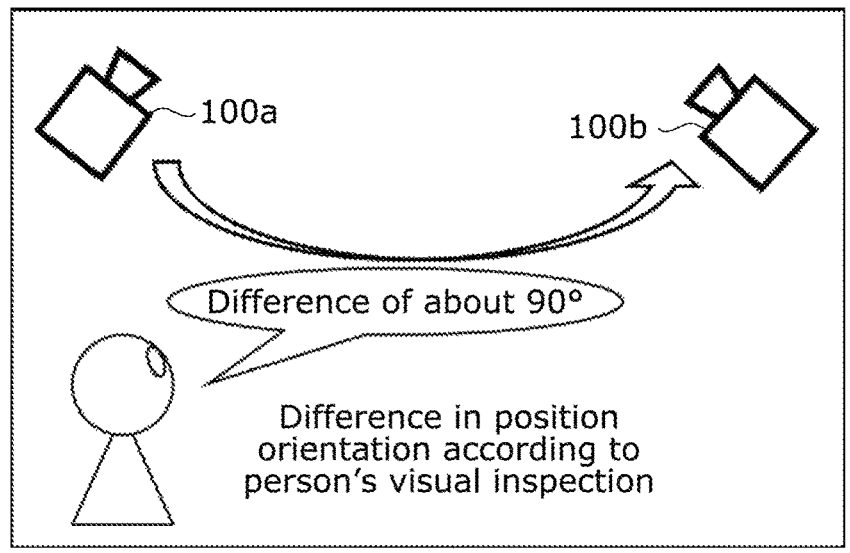
FIG. 7A is a diagram for describing an example of parameter information.

As illustrated in FIG. 7A, each item of parameter information may be, for example, information indicating a difference in position orientation between camera 100a included in the imaging apparatus corresponding to the item of parameter information and camera 100b included in another imaging apparatus (a position orientation of camera 100a relative to camera 100b). Note that cameras 100a and 100b are included in the plurality of cameras 100 of imaging apparatuses 10a to 10n. The difference in position orientation may be an angle between the imaging direction of camera 100a and the imaging direction of camera 100b, may be a distance between camera 100a and camera 100b, or may be both the angle and the distance.

Figure 7B:
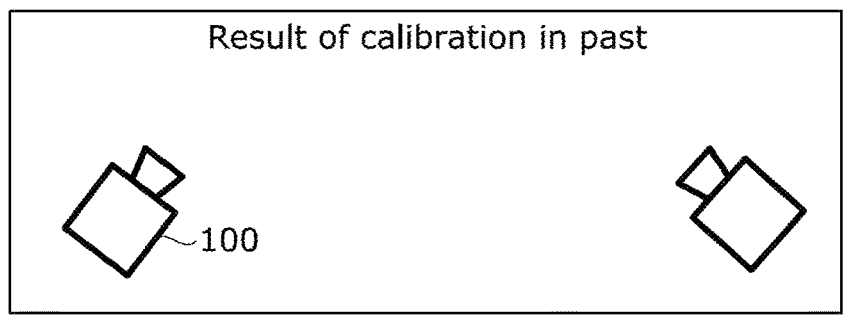
FIG. 7B is a diagram for describing an example of parameter information.
Figure 7C:
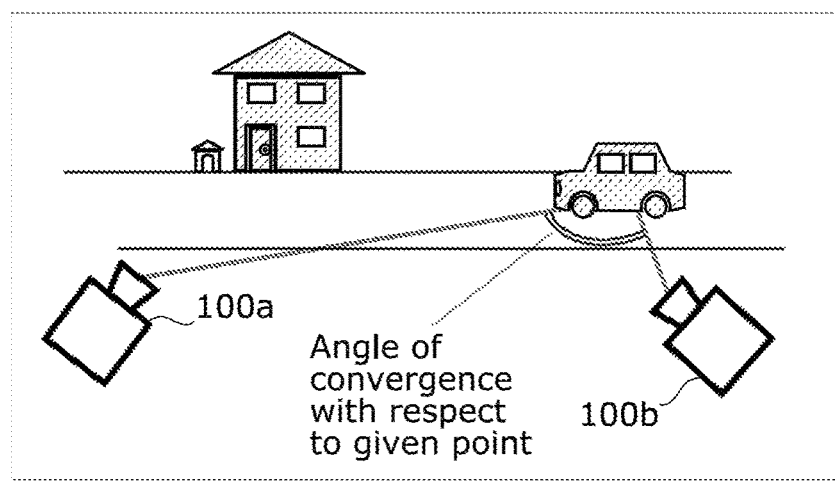
FIG. 7C is a diagram for describing an example of parameter information.
Figure 7D:
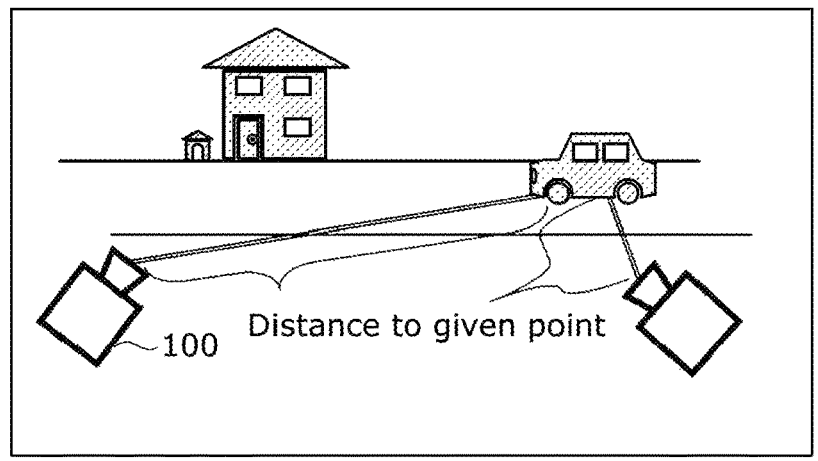
FIG. 7D is a diagram for describing an example of parameter information.
Figure 7E:
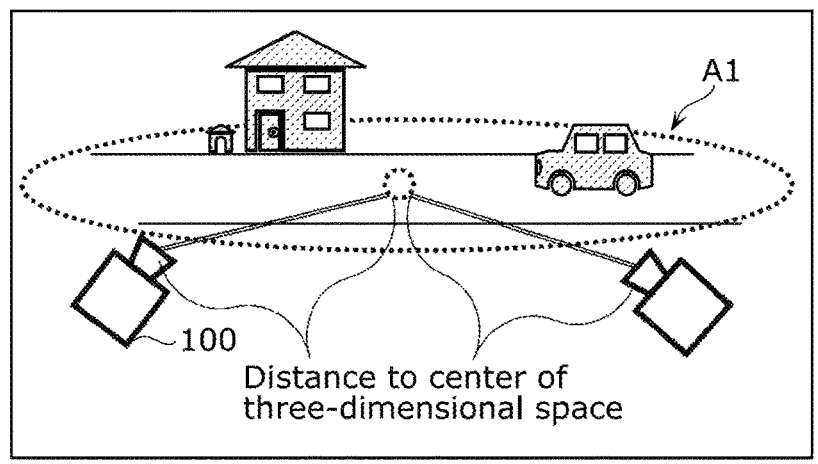
FIG. 7E is a diagram for describing an example of parameter information.
Figure 7F:
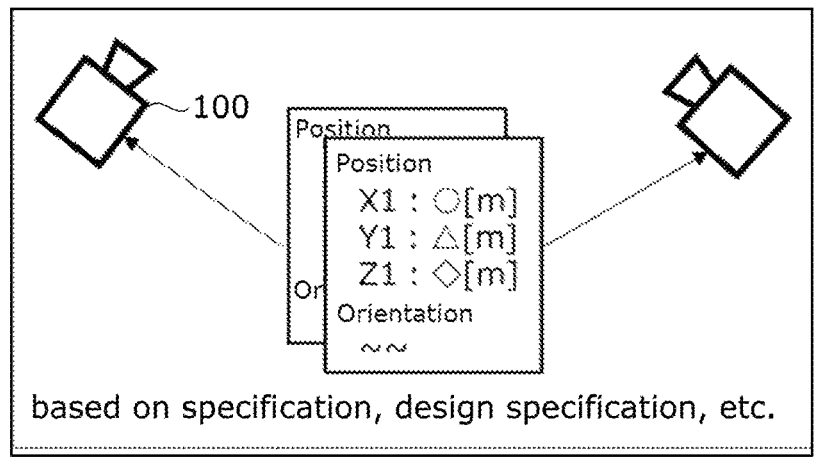
FIG. 7F is a diagram for describing details of an example of parameter information.

As illustrated in FIG. 7B, each item of parameter information may be, for example, information that includes a calibration result obtained by calibration performed at a past point in time on camera 100 included in the imaging apparatus corresponding to the item of parameter information. Also, as illustrated in FIG. 7C, each item of parameter information may be, for example, information indicating an angle between a straight line connecting camera 100a and a given point in the three-dimensional space and a straight line connecting camera 100b and the given point, that is, an angle of convergence of cameras 100a and 100b with respect to the given point. Also, as illustrated in FIG. 7D, each item of parameter information may be, for example, information indicating a distance from camera 100 to a given point in the three-dimensional space. Also, as illustrated in FIG. 7E, each item of parameter information may be, for example, information indicating a distance from camera 100 to the center of three-dimensional space A1, which is the common imaging target for each camera 100. Note that the center of three-dimensional space A1 may be the center of gravity of the two-dimensional shape of three-dimensional space A1 in plan view along the vertical direction, or may be the center of gravity of the three-dimensional shape of three-dimensional space A1. Also, as illustrated in FIG. 7F, each item of parameter information may be, for example, information indicating the position orientation of camera 100 based on a specification, a design specification etc. drawn up at the system design stage.

Note that each item of parameter information described with reference to FIG. 7A to FIG. 7F is a mere example, and is not intended to limit the elements included in the parameter information. The parameter information need not represent with high accuracy the position orientation of each imaging apparatus at the point in time of calibration. The parameter information may be information obtained based on a result of estimation by a person, information obtained through measurement by a sensor, information that is calculated by camera calibration performed at a different point in time and is stored in storage 301, or information combining such information. Parameter obtaining circuit 302b may store the parameter information in storage 301 in advance, prior to receiving a calibration instruction from control apparatus 200. This allows the calibration processing to start when calibration is determined to be necessary. In other words, calibration apparatus 300 can start the calibration processing without having to newly obtain the parameter information.

Pre-processing circuit 302c performs image pre-processing, matching pre-processing, or a combination thereof. The pre-processing is, for example, brightness adjustment, noise removal, resolution conversion, color space conversion, lens distortion correction, projective transformation, affine transform, edge enhancement processing, trimming processing, or a combination thereof. Since it is sufficient so long as image pre-processing is performed on a plurality of images obtained by image obtaining circuit 302a, it is not necessary to perform the image pre-processing at the same time as when the calibration processing is performed, and the image pre-processing may be performed in advance. A plurality of pre-processed images obtained through the image pre-processing performed by pre-processing circuit 302c may be stored in storage 301.

The matching pre-processing is, for example, processing of restricting combinations of images used for feature point matching. This allows matching calculation processing, which will be described later, to be performed efficiently. Note that the matching pre-processing may be performed using the parameter information. Information obtained through the matching pre-processing performed by pre-processing circuit 302c may be stored in storage 301.

Note that the pre-processing by pre-processing circuit 302c need not necessarily be performed. Thus, calibration apparatus 300 may have a configuration excluding pre-processing circuit 302c.

Search window generation circuit 302d generates, for each of the images obtained by image obtaining circuit 302a, search window information indicating at least one search window to extract a plurality of feature points of the image using the plural items of parameter information obtained by parameter obtaining circuit 302b. A search window is used for extracting, from an image, a patch having a shape of the search window and used for writing a feature amount. In the present embodiment, a patch refers to an area defined by the shape of a search window, and is a partial image that is obtained by cutting out a partial area of an image and that includes the original image. In particular, a patch that is extracted around a keypoint in the image and is used for writing a feature amount is a feature amount patch. The search window information includes information indicating the shape of a search window used for extracting a patch, and the shape of a search window is calculated by changing a search window reference shape based on the parameter information. Note that the search window reference shape is a predetermined shape, and is obtained from an apparatus outside calibration system 1000 or from storage 301.

Specifically, search window generation circuit 302d generates, based on the items of parameter information, a search window having a shape that increases in length in a direction substantially perpendicular to an arrangement direction of camera 100a included in one imaging apparatus that has captured a processing target image and camera 100b included in another imaging apparatus with an increase in difference in position orientation between camera 100a and camera 100b in the arrangement direction. The present embodiment assumes that camera 100a and camera 100b are arranged in the horizontal direction. Thus, search window generation circuit 302d generates a search window having a shape that is long in the vertical direction (hereinafter also referred to as "vertically long"). For example, search window generation circuit 302d extracts a variable based on the parameter information, calculates, using the search window reference shape and the extracted variable, a search window candidate that increases in vertical length with an increase in the variable, and generates search window information indicating the search window candidate calculated. Note that when a plurality of cameras are arranged in the vertical direction, search window generation circuit 302d generates a search window having a shape that is long in the horizontal direction.

Figure 8:
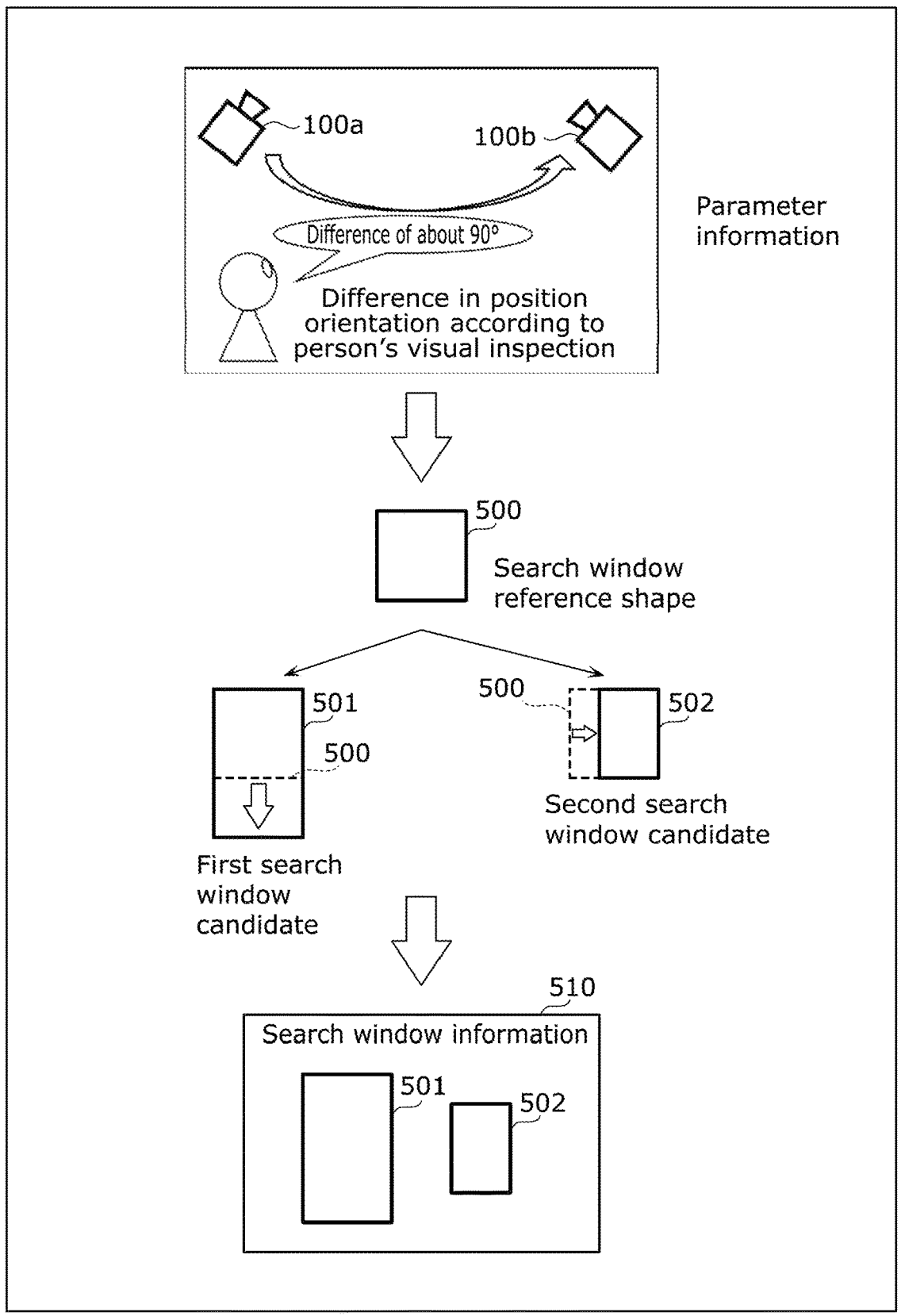
FIG. 8 is a diagram for describing details of calibration processing according to Embodiment 1.

For example, as illustrated in FIG. 8, assume that the parameter information indicates that the difference in position orientation between two cameras; camera 100a and camera 100b for example, is an angle of 90° formed between the imaging directions of the two cameras. In this case, using the angle of 90°, search window generation circuit 302d determines n/2 as variable θ (>0) used for calculating a search window candidate. At this time, search window generation circuit 302d, for example, generates, as first search window candidate 501, a search window having a shape calculated by multiplying the height of search window reference shape 500 by ($\alpha\theta+\beta$), and generates, as second search window candidate 502, a search window having a shape calculated by multiplying the width of search window reference shape 500 by [$\alpha'(1/\theta)+\beta'$]. This way, search window generation circuit 302d generates search window information 510 including first search window candidate 501 and second search window candidate 502.

Note that the width of the shape of first search window candidate 501 is equal to the width of search window reference shape 500. The height of the shape of second search window candidate 502 is equal to the height of search window reference shape 500. Each of $\alpha$, $\alpha'$, $\beta$, and $\beta'$ is any given constant greater than or equal to 0. Also, ($\alpha\theta+\beta$) is a value greater than 1, and [$\alpha'(1/\theta)+\beta'$] is a value less than 1.

It is sufficient so long as search window generation circuit 302d uses, as variable θ, an index that increases in proportion to the difference in position orientation between cameras, and the present disclosure is not limited to the above-described use of an angle between the imaging directions of two cameras as variable θ. As described above, by using, as variable θ, an index that increases in proportion to the difference in position orientation between cameras, search window generation circuit 302d can calculate a search window having a shape that increases in vertical length with an increase in degree of difference between the position and orientation of a camera and the position and orientation of another camera. Note that it is sufficient so long as search window generation circuit 302*d* generates at least one search window candidate, and the present disclosure is not limited to the above-described case of generating two search window candidates, that is, first search window candidate 501 and second search window candidate 502.

In addition, the shape and the calculating method of the search window are not limited to those described above. For example, search window generation circuit 302*d* may prepare, in advance, a plurality of search windows that are different in at least one of shape or size, and select at least one search window according to the parameter information of an imaging apparatus from the search windows prepared in advance, so as to generate the search window information including at least one search window selected. Search window generation circuit 302*d* may calculate the search window by performing geometric calculation according to the parameter information.

Further, search window generation circuit 302*d* may generate the search window information and store the generated search window information in storage 301 in advance, prior to receiving a calibration instruction from control apparatus 200. This allows calibration apparatus 300 to start the calibration processing when calibration is determined to be necessary. In other words, calibration apparatus 300 can start the calibration processing without having to generate the search window information after calibration is determined to be necessary.

Extraction circuit 302*e* performs keypoint detection processing, feature amount patch extraction processing, and feature amount writing processing for each of the images which have been subjected to the pre-processing by pre-processing circuit 302*c*. This way, extraction circuit 302*e* extracts a plurality of feature points for each of the images. Note that when calibration apparatus 300 does not include pre-processing circuit 302*c*, extraction circuit 302*e* performs all the above processing on each of the images obtained by image obtaining circuit 302*a*.

The keypoint detection processing is processing of detecting a characteristic point in a processing target image as a keypoint. In the keypoint detection processing, orientation information indicating an orientation direction of a keypoint may be further obtained. For example, as illustrated in (a) in FIG. 9, extraction circuit 302*e* detects characteristic point P1 in processing target image 520 as a keypoint. Note that although FIG. 9 illustrates an example in which one keypoint P1 is detected for simplifying the description, a plurality of keypoints are detected in the actual keypoint detection processing.

The feature amount patch extraction processing is processing of extracting a plurality of feature amount patches from a processing target image, using the search window information generated by search window generation circuit 302*d*. The feature amount patch extraction processing is, for example, processing of extracting, for each of the plurality of keypoints detected in the keypoint detection processing, at least one feature amount patch by placing at least one search window indicated by the search window information on the processing target image such that the center of the at least one search window is located on the keypoint. This way, a plurality of feature amount patches are extracted from the processing target image.

Figure 9:
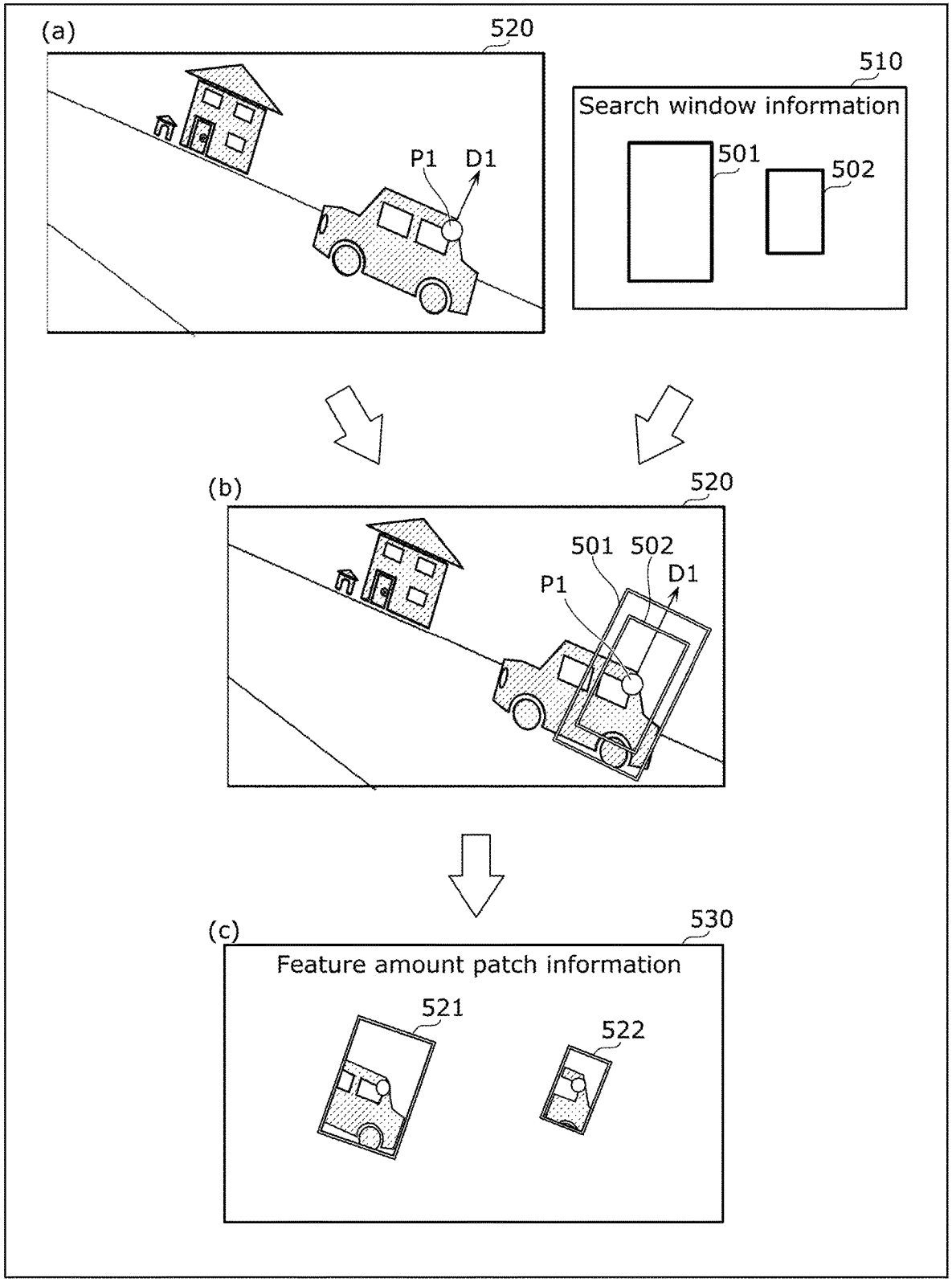
FIG. 9 is a diagram for describing details of calibration processing according to Embodiment 1.

For example, as illustrated in (b) in FIG. 9, in order to extract the feature amount patches, extraction circuit 302*e* rotates first search window candidate 501 and second search window candidate 502 included in search window information 510 so that the vertical direction agrees with orientation direction D1 indicated by the orientation information of keypoint P1. Subsequently, extraction circuit 302*e* places first search window candidate 501 at a position on image 520 at which the center of first search window candidate 501 agrees with keypoint P1. Likewise, extraction circuit 302*e* places second search window candidate 502 at a position on image 520 at which the center of second search window candidate 502 agrees with keypoint P1. Subsequently, extraction circuit 302*e* extracts feature amount patch 521 by cutting out from image 520 according to the shape of first search window candidate 501, and extracts feature amount patch 522 by cutting out from image 520 according to the shape of second search window candidate 502. This way, extraction circuit 302*e* generates feature amount patch information 530 including feature amount patches 521 and 522. This allows extraction of more robust feature amounts in the feature amount writing processing which will be described later.

Note that extraction circuit 302*e* may extract a feature amount patch after scaling a search window using scale information of the keypoint detected.

Extraction circuit 302*e* need not perform a process on a search window using the rotation for agreement with orientation direction D1 of keypoint P1, or a process on a search window using the scaling based on scale information. Extraction circuit 302*e* may extract a feature amount patch without performing these processes on a search window, may extract a feature amount patch by performing one of these processes, or may extract a feature amount patch by performing both of these processes.

Figure 10:
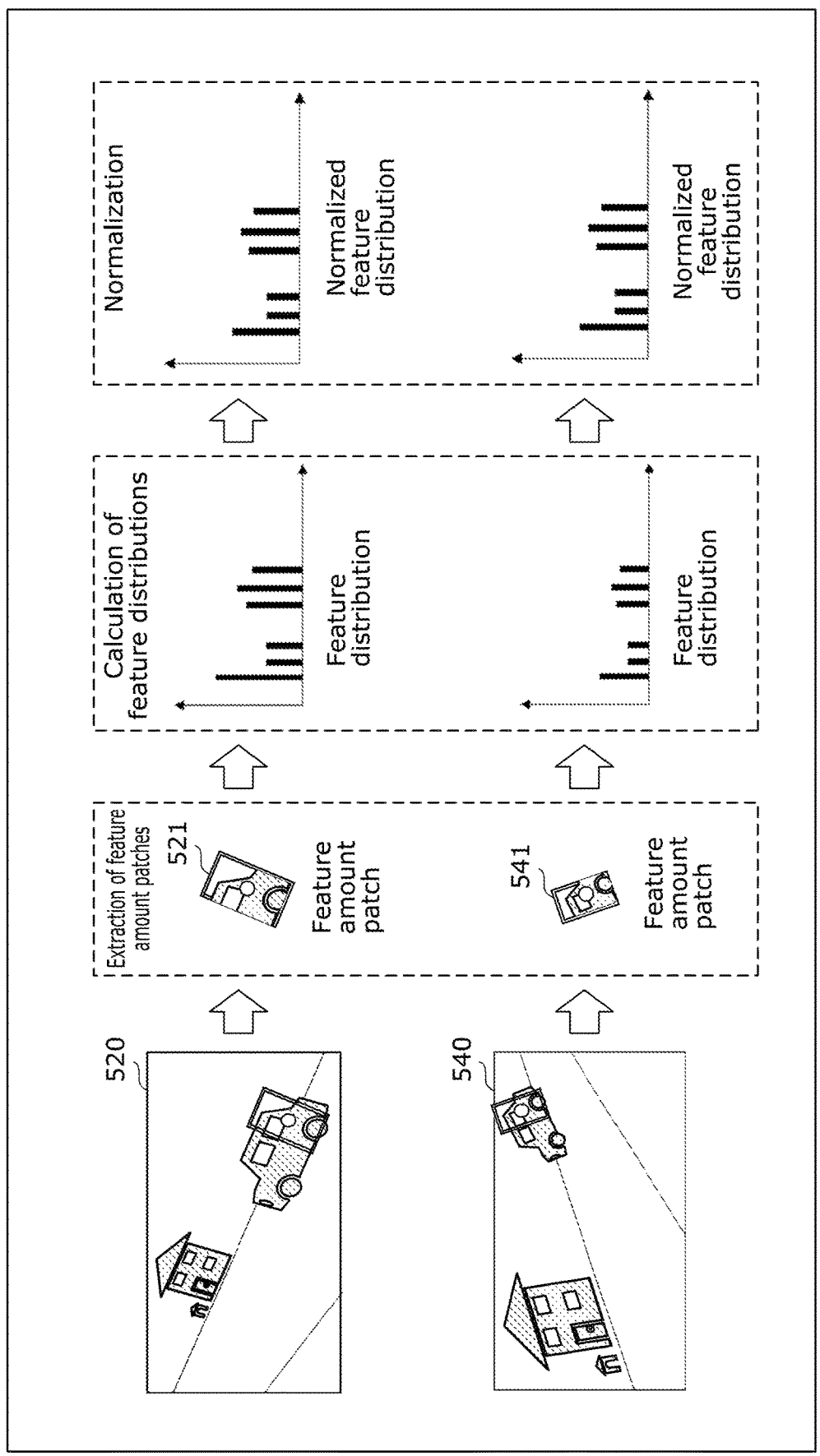
FIG. 10 is a diagram for describing details of calibration processing according to Embodiment 1.

The feature amount writing processing is processing of extracting a feature point by, for each of the plurality of keypoints detected by the keypoint detection processing, calculating, as a feature amount, a feature distribution of each feature amount patch extracted for the keypoint and writing the calculated feature distribution in the keypoint. For example, as illustrated in FIG. 10, extraction circuit 302*e* calculates a feature distribution of feature amount patch 521 extracted from image 520, and normalizes the calculated feature distribution. By using the result obtained from this processing, it is possible to calculate a degree of similarity between feature amount patch 521 and feature amount patch 541 regardless of the sizes of the feature amount patches. Note that extraction circuit 302*e* may perform the feature amount writing processing after projective transformation is performed on the feature amount patches such that all or some of the feature amount patches have the same size.

Note that extraction circuit 302*e* may extract feature points using a scale-invariant feature transform (SIFT) algorithm, for example.

Figure 11:
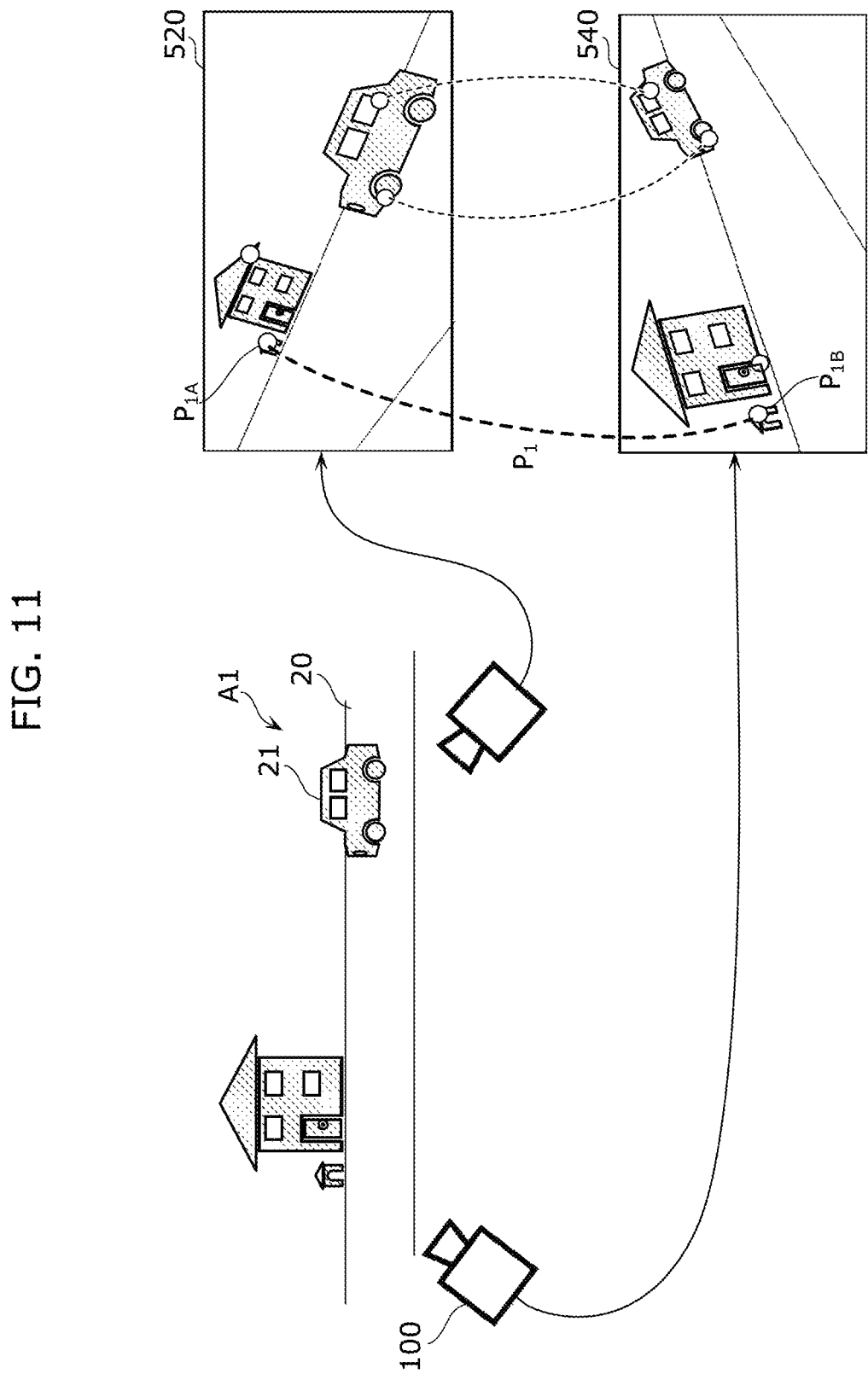
FIG. 11 is a diagram for describing details of calibration processing according to Embodiment 1.

Matching calculation circuit 302*f* performs feature point matching between the images using the plurality of feature points extracted for each of the images by extraction circuit 302*e*. Among the plurality of feature points, matching calculation circuit 302*f* associates feature points whose normalized feature distributions are similar, and outputs the associated feature points as a matching result. Matching calculation circuit 302*f* determines whether feature points are similar, using a squared error or an absolute error of the feature points. For example, as illustrated in FIG. 11, matching calculation circuit 302*f* performs feature point matching using a plurality of feature points indicated by white circles in image 520 and a plurality of feature points indicated by white circles in image 540, so as to associate feature point $P_{1A}$ in image 520 and feature point $P_{1B}$ in image 540 as matching points $P_1$. Since matching calculation circuit 302*f* performs the feature point matching on other feature points in the same manner, a plurality of matching points are obtained as matching results. The matching results outputted by matching calculation circuit 302f are stored in, for example, storage 301.

Calibration circuit 302g performs calibration processing based on the matching results obtained by matching calculation circuit 302f to calibrate the parameters of cameras 100 included in imaging apparatuses 10a to 10n. The calibration processing is to calculate external parameters or internal parameters, or both, of cameras 100 included in imaging apparatuses 10a to 10n, using a geometric constraint such as an epipolar constraint based on the plurality of matching results obtained through the image capturing performed by cameras 100 included in imaging apparatuses 10a to 10n. The external parameters or internal parameters, or both, of cameras 100 may be stored in storage 301. The external parameters and internal parameters of the cameras stored in storage 301 may be obtained by parameter obtaining circuit 302b in calibration performed at a different point in time. This makes it possible to perform calibration using, as the parameter information, camera parameters obtained at a past point in time.

Further, from the plurality of matching results, calibration circuit 302g estimates a three-dimensional position, in the three-dimensional space, of each matching result. Specifically, calibration circuit 302g uses a triangulation method to estimate a three-dimensional position, in the three-dimensional space, of each matching result.

[2-4. Others]

The elements of calibration system 1000 according to the present embodiment have been described above. These elements are not limited to the above description.

[3. Operation of Calibration System]

Next, the operation that calibration system 1000 according to the present embodiment performs to implement the calibration at an appropriate time is described.

To perform the calibration at an appropriate time, calibration system 1000 determines whether to perform the calibration processing when a change (an event) occurs to an imaging apparatus or the surrounding environment.

Figure 12:
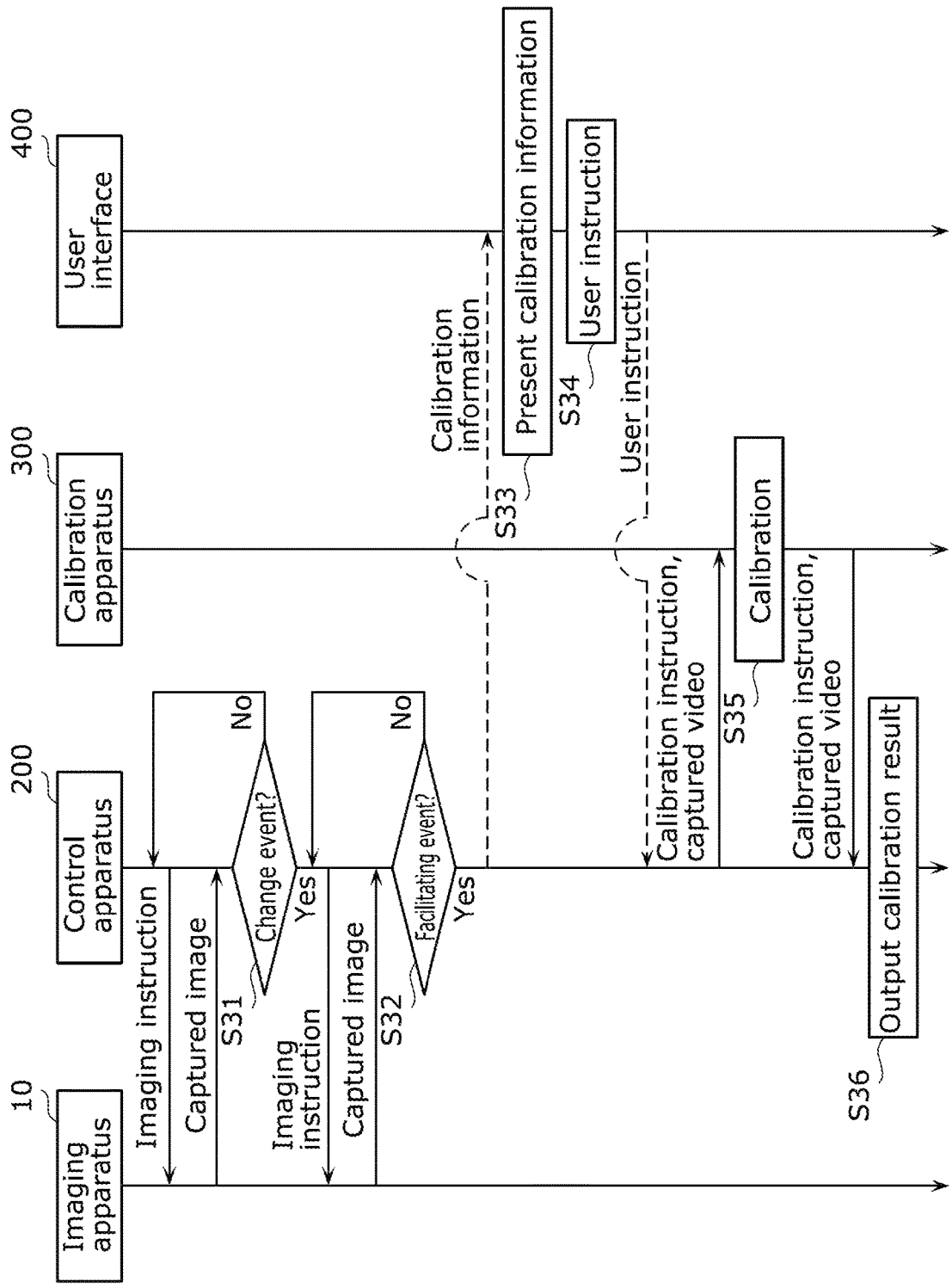
FIG. 12 is a sequence diagram for describing details of calibration processing.

FIG. 12 is a sequence diagram for describing a series of operations performed by calibration system 1000 according to the present embodiment, including determination as to whether the calibration is to be performed. Note that imaging apparatus 10 in FIG. 12 represents a given one of imaging apparatuses 10a to 10n illustrated in FIG. 3.

Event detector 202b of control apparatus 200 obtains a circumstance of imaging apparatus 10 (or camera 100) and a circumstance of the surrounding environment constantly or on a predetermined cycle from a video captured by imaging apparatus 10, and detects a change in these circumstances as a change event (S31). A change in the circumstances is a change by which the current camera parameter becomes inaccurate in indicating the position orientation of camera 100, and is specifically a change in the imaging area, for example. The detection of a change event does not require identification of a factor that has caused the change in the imaging area. Event detector 202b detects, as a change event that causes the calibration processing to start, a change in the circumstances caused by movement of camera 100, movement of stand 110 on which camera 100 is disposed, movement of a peripheral object such as a pole or a pedestal on which imaging apparatus 10 is disposed, deterioration of a component of camera 100, or a combination thereof. A change in the circumstances is not limited to a change in the imaging area described above.

Further, event detector 202b of control apparatus 200 detects a change to a circumstance that facilitates the calibration processing as a facilitating event (S32). A facilitating event is, for example, a change to a circumstance in which the number of moving objects such as persons or vehicles present in three-dimensional space A1, which is the imaging target of imaging apparatus 10, is greater than or equal to a certain number. In other words, a facilitating event is a change from a circumstance in which the number of moving objects included in an image captured by imaging apparatus 10 is less than a certain number to a circumstance in which the number of moving objects included in an image captured by imaging apparatus 10 is greater than or equal to the certain number. By using an image that has captured a circumstance in which many moving objects are present, a large number of feature points can be obtained, thus increasing the accuracy of the calibration result. In other words, the calibration processing is facilitated.

Control apparatus 200 gives a calibration instruction at a time when the facilitating event is detected after the change event has been detected by event detector 202b. This makes it possible to perform the calibration processing at the time when the calibration is necessary, and determine camera parameters accurately. When event detector 202b has detected the change event (Yes in S31) and then detected no facilitating event (No in S32), control apparatus 200 outputs an imaging instruction to imaging apparatus 10 while holding the result that the change event has been detected, and receives a captured image from imaging apparatus 10 so as to determine again whether a facilitating event has occurred. When a facilitating event is detected by event detector 202b (Yes in S32), event detector 202b outputs calibration information.

The calibration information includes target cameras 100 which are to be subjected to the calibration (or imaging apparatuses 10 that include target cameras 100) and the reason for determining that the calibration is to be performed (the above-described event). The calibration information is input to calibration instructor 202c. Calibration instructor 202c that has received the calibration information generates a calibration instruction based on the contents of the calibration information, and transmits the generated calibration instruction to imaging apparatuses 10 that include relevant cameras 100.

The calibration information may be, for example, transmitted to user interface 400 and presented to a user such as a system administrator (S33). The user inputs, via user interface 400, an instruction to perform the calibration on target cameras 100 based on the calibration information (S34). The inputted user instruction is transmitted to control apparatus 200.

Camera 100 of imaging apparatus 10 that has received the imaging instruction performs imaging processing. Calibration apparatus 300 that has received the calibration instruction performs the calibration processing (S35). Calibration apparatus 300 performs the calibration processing based on the calibration instruction, and calibrates the external parameters of all imaging apparatuses 10a to 10n. Note that in the case of calibrating the internal parameters, controller 102 of camera 100 may perform the calibration. Control apparatus 200 outputs camera parameters as the calibration result calculated through the calibration processing (S36).

Next, a specific example of the calibration processing is described.

Figure 13:
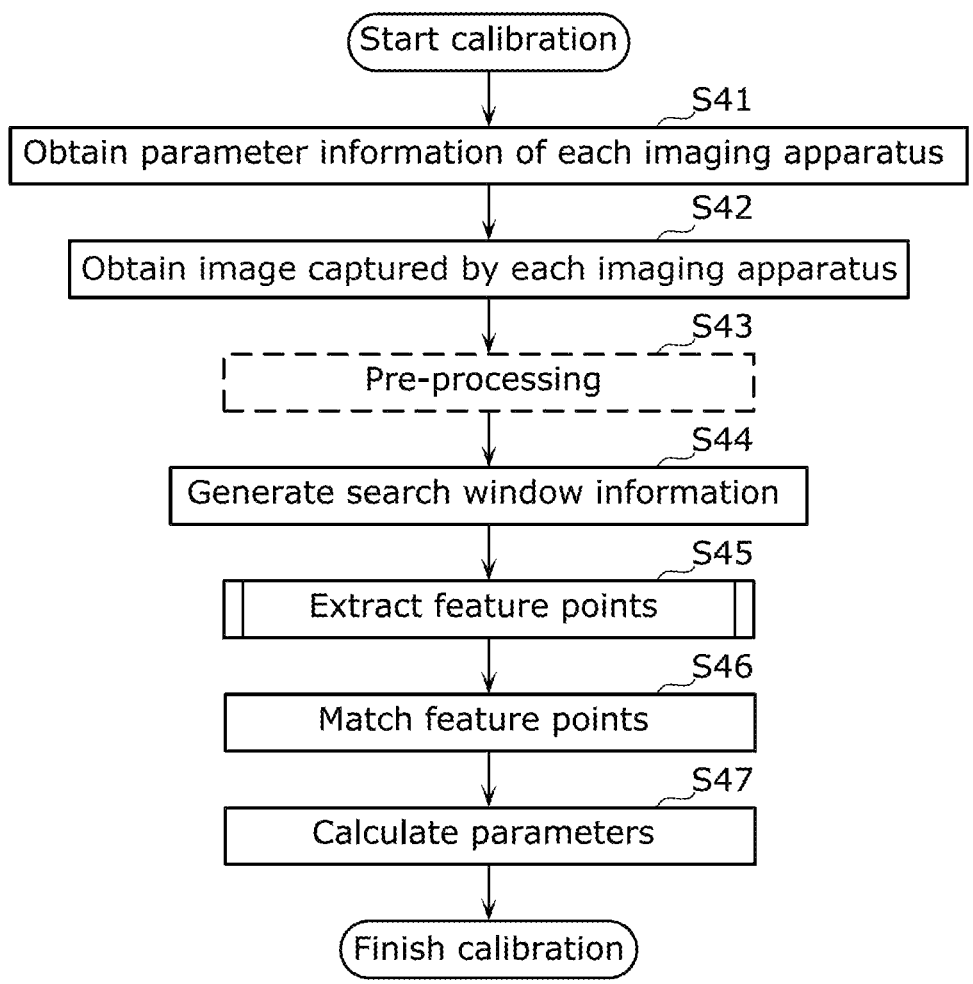
FIG. 13 is a flowchart for describing details of calibration processing according to Embodiment 1.
Figure 14:
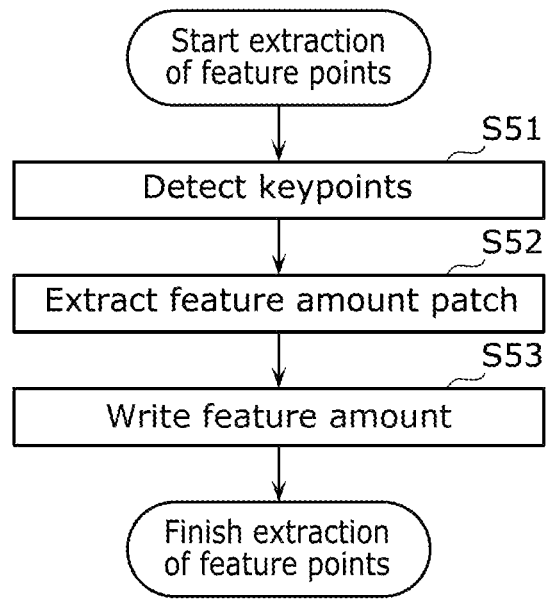
FIG. 14 is a flowchart illustrating an example of feature point extraction processing according to Embodiment 1.

FIG. 13 is a flowchart illustrating an example of the calibration processing according to Embodiment 1. FIG. 14 is a flowchart illustrating an example of feature point extraction processing according to Embodiment 1.

In the calibration processing performed by calibration apparatus 300 according to the present embodiment, first, parameter obtaining circuit 302b obtains parameter information related to the parameters of imaging apparatuses 10a to 10n (S41).

Next, image obtaining circuit 302a obtains images captured by imaging apparatuses 10a to 10n (S42). Note that Step S42 may be performed prior to Step S41, or may be performed in parallel with Step S41.

Next, pre-processing circuit 302c performs pre-processing on each of the images (S43). As stated above, the pre-processing need not be performed.

Search window generation circuit 302d calculates, for each of the pre-processed images, search window information indicating at least one search window to extract a plurality of feature points of the image, using a plurality of items of parameter information of imaging apparatuses 10a to 10n obtained (S44).

Extraction circuit 302e extracts a plurality of feature points for each of the pre-processed images (S45). When the pre-processing is not performed, extraction circuit 302e performs the feature point extraction processing on each of the images obtained by image obtaining circuit 302a. Next, the details of the feature point extraction processing is described with reference to FIG. 14.

In the feature point extraction processing, first, extraction circuit 302e detects a plurality of keypoints from a processing target image (S51).

Next, for each of the plurality of keypoints detected from the processing target image, extraction circuit 302e extracts at least one feature amount patch by placing the at least one search window indicated by the search window information on the processing target image such that the center of the at least one search window is located on the keypoint (S52).

Subsequently, for the processing target image, extraction circuit 302e calculates, as a feature amount, a feature distribution of each feature amount patch extracted for a target keypoint and writes the calculated feature distribution in the target keypoint, so as to extract, as a feature point, the keypoint in which the feature amount has been written (S53).

Matching calculation circuit 302f performs feature point matching between the images using the plurality of feature points extracted for each of the images (S46).

Calibration circuit 302g calibrates the parameters of cameras 100 included in imaging apparatuses 10a to 10n based on a plurality of matching results obtained by the feature point matching (S47).

For example, calibration circuit 302g estimates a three-dimensional position, in the three-dimensional space, of each of the plurality of matching results. Subsequently, calibration circuit 302g matches feature points which have been extracted from a plurality of captured images obtained by cameras 100 of imaging apparatuses 10a to 10n capturing the imaging area and which have a common three-dimensional position. Subsequently, calibration circuit 302g calculates camera parameters of imaging apparatuses 10a to 10n using the matching results. Specifically, the camera parameters of imaging apparatuses 10a to 10n are calculated using a geometric constraint such as an epipolar constraint based on the matching results.

[4. Advantageous Effects etc.]

As described above, in the present embodiment, calibration apparatus 300 calibrates camera parameters of cameras 100 included in imaging apparatuses 10a to 10n that are disposed in different positions and capture a common three-dimensional space. The calibration includes: obtaining images captured by imaging apparatuses 10a to 10n; obtaining items of parameter information that are related to parameters each of which is a parameter of a different one of imaging apparatuses 10a to 10n; for each of the images obtained, generating search window information indicating at least one search window to extract a plurality of feature points of the image using the items of parameter information obtained; for each of the images obtained, extracting the plurality of feature points using the search window information generated; performing feature point matching between the images using the plurality of feature points extracted for each of the images; and calibrating the parameters of imaging apparatuses 10a to 10n based on a plurality of matching results obtained by the feature point matching.

According to this, the extraction of a plurality of feature points, which is performed for the feature point matching between the images, is performed using the search window information generated using the items of parameter information of imaging apparatuses 10a to 10n. This enables extraction of feature points from the images, considering that the images are the results of image capturing performed at different positions. This makes it possible to increase the matching accuracy while reducing the matching processing load. Accordingly, it is possible to accurately calibrate the parameters of cameras 100 included in imaging apparatuses 10a to 10n disposed in different positions.

In the present embodiment, each of the items of parameter information is information related to a position orientation of a corresponding imaging apparatus that corresponds to the item of parameter information, is information obtained by calibration performed on the corresponding imaging apparatus at a past point in time, and includes a camera label that identifies the corresponding imaging apparatus. Thus, by performing the calibration using the items of parameter information obtained in the past, it is possible to efficiently calibrate the parameters of imaging apparatuses 10a to 10n.

In the present embodiment, each of the items of parameter information is information related to a position orientation of a corresponding imaging apparatus that corresponds to the item of parameter information, is information related to a relative position orientation of the corresponding imaging apparatus relative to an other imaging apparatus, and includes a camera label that identifies the corresponding imaging apparatus. Thus, by performing the calibration using, as the parameter information, information related to a position orientation of a target imaging apparatus relative to another imaging apparatus, it is possible to efficiently calibrate the parameters of imaging apparatuses 10a to 10n.

In the present embodiment, each of the items of parameter information is information related to a position orientation of a corresponding imaging apparatus that corresponds to the item of parameter information, is information indicating a distance from the corresponding imaging apparatus to a given point in the common three-dimensional space, and includes a camera label that identifies the corresponding imaging apparatus. Thus, by performing the calibration using, as the parameter information, information indicating a distance from a target imaging apparatus to a given point in the three-dimensional space, it is possible to efficiently calibrate the parameters of imaging apparatuses 10a to 10n.

In the present embodiment, the generating of the search window information includes calculating, based on the items of parameter information, at least one search window including a search window having a shape that increases in length in a direction substantially perpendicular to an arrangement direction of one imaging apparatus that has captured the image and an other imaging apparatus with an increase in difference in position orientation between the one imaging apparatus and the other imaging apparatus in the arrangement direction. This makes it possible to calculate a search window according to the imaging apparatus that has captured the image, and effectively extract feature points from the images.

In the present embodiment, the extracting of the plurality of feature points includes (i) detecting a plurality of keypoints from the image, and (ii) for each of the plurality of keypoints detected, (ii-i) extracting at least one feature amount patch by placing the at least one search window indicated by the search window information on the image such that a center of the at least one search window is located on the keypoint, and (ii-ii) extracting a feature point by calculating, as a feature amount, a feature distribution of each of the at least one feature amount patch extracted for the keypoint and writing the feature distribution in the keypoint. This makes it possible to extract a plurality of feature points that include feature amounts according to the items of parameter information of imaging apparatuses 10a to 10n.

Embodiment 2

As in Embodiment 1, a calibration apparatus according to the present embodiment is a calibration apparatus that calibrates parameters of a plurality of imaging apparatuses that are disposed in different positions and capture a common three-dimensional space.

Figure 15:
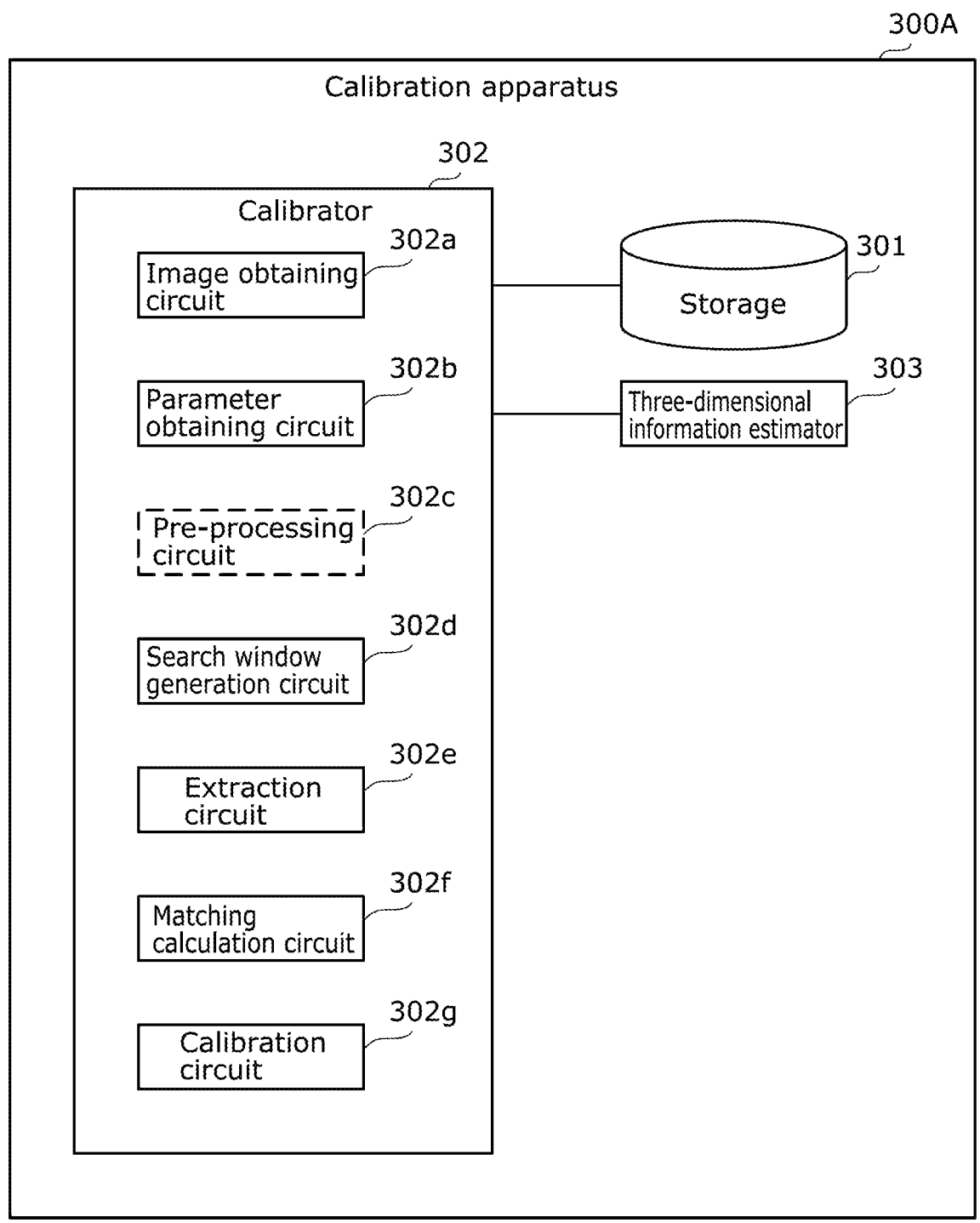
FIG. 15 is a block diagram illustrating a configuration of a calibration apparatus according to Embodiment 2.

In the present embodiment, candidates for the feature points to be associated by matching calculation circuit 302f are restricted based on a three-dimensional model reconstructed using parameters of imaging apparatuses 10a to 10n that are stored in storage 301. As illustrated in FIG. 15, calibration apparatus 300A has a configuration including three-dimensional information estimator 303 in addition to the configuration according to Embodiment 1. The configuration of calibrator 302 is the same as the configuration according to Embodiment 1, but the functions and the input/output of parameter obtaining circuit 302b, search window generation circuit 302d, and matching calculation circuit 302f are different from those in Embodiment 1. Hereinafter, operations of three-dimensional information estimator 303 and calibrator 302 are described.

When the calibration processing is performed, parameter obtaining circuit 302b of calibrator 302 obtains, for each of cameras 100 included in imaging apparatuses 10a to 10n, first parameter information indicating a parameter of camera 100, from an apparatus outside calibration apparatus 300A or from storage 301. The parameter of each camera 100 includes an internal parameter and an external parameter of camera 100. For example, when parameter obtaining circuit 302b was able to obtain both an internal parameter and an external parameter of camera 100, parameter obtaining circuit 302b outputs the first parameter information including the obtained parameters to three-dimensional information estimator 303. Each item of the first parameter information is, as in the example illustrated in FIG. 7B according to Embodiment 1, information related to the position orientation of camera 100, information obtained by the calibration performed on a corresponding imaging apparatus at a past point in time, and includes a camera label that identifies the corresponding imaging apparatus.

The reason why the calibration processing is performed even when camera parameters are present is because, as described in Embodiment 1, the position orientations of imaging apparatuses 10a to 10n disposed in the imaging environment vary due to various factors. The various factors include, for example, vibration of a building, a road, etc., wind and rain, and deterioration over time of the stand and the location at which the imaging apparatuses are disposed. In addition to these, there are also factors such as the time elapsed since the calibration performed in the past, and uncertainty of information calculated using data other than images. That is to say, since there is a possibility that the parameters of cameras 100 obtained by parameter obtaining circuit 302b are low in accuracy at the time of the calibration processing, it is not appropriate to use the parameters as they are, as the calibration result. Thus, in the present embodiment, the feature point matching is performed based on the first parameter information obtained by parameter obtaining circuit 302b.

Note that the first parameter information obtained by parameter obtaining circuit 302b may be input to calibration circuit 302g. The input of the first parameter information to calibration circuit 302g allows each parameter to be used as an initial value, thus enabling calibration circuit 302g to efficiently perform calculation.

Figure 16:
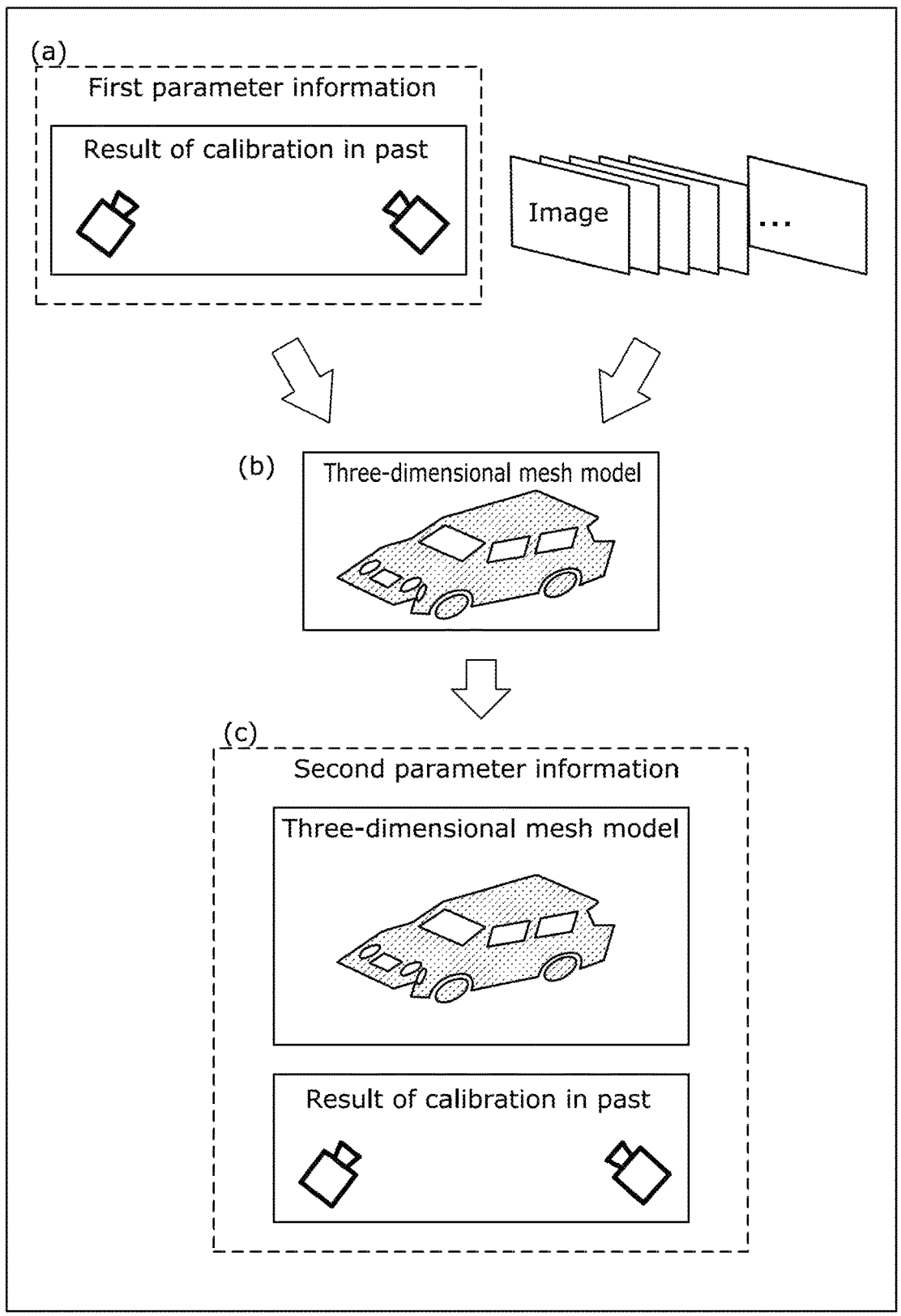
FIG. 16 is a schematic diagram for describing details of calibration processing according to Embodiment 2.

When the calibration processing is performed, three-dimensional information estimator 303 estimates three-dimensional information that indicates a three-dimensional model, based on a plurality of images obtained by image obtaining circuit 302a and a plurality of items of first parameter information of cameras 100 obtained by parameter obtaining circuit 302b as illustrated in (a) in FIG. 16. The three-dimensional information is, for example, a three-dimensional mesh model represented by a combination of planes as illustrated in (b) in FIG. 16. Note that the three-dimensional model indicated by the three-dimensional information need not be a three-dimensional mesh model, and may be a point group, or may be voxels. Also, the three-dimensional information may be a depth image. The three-dimensional information need not be the result of highly accurate estimation of the shape of an object in a three-dimensional space, and may be, in the case of a point group model for example, the result of shape estimation at such a degree of accuracy that does not cause significant impairment of the phase relationship between points.

Subsequently, as illustrated in (c) in FIG. 16, three-dimensional information estimator 303 generates a plurality of items of second parameter information by adding the estimated three-dimensional information to the plurality of items of first parameter information obtained by parameter obtaining circuit 302b. Three-dimensional information estimator 303 outputs the plurality of items of second parameter information to search window generation circuit 302d.

Search window generation circuit 302d generates, for each of the images obtained by image obtaining circuit 302a, search area information indicating at least one search area for restricting combinations of feature points to be matched, based on the plurality of items of second parameter information outputted from three-dimensional information estimator 303.

Figure 17:
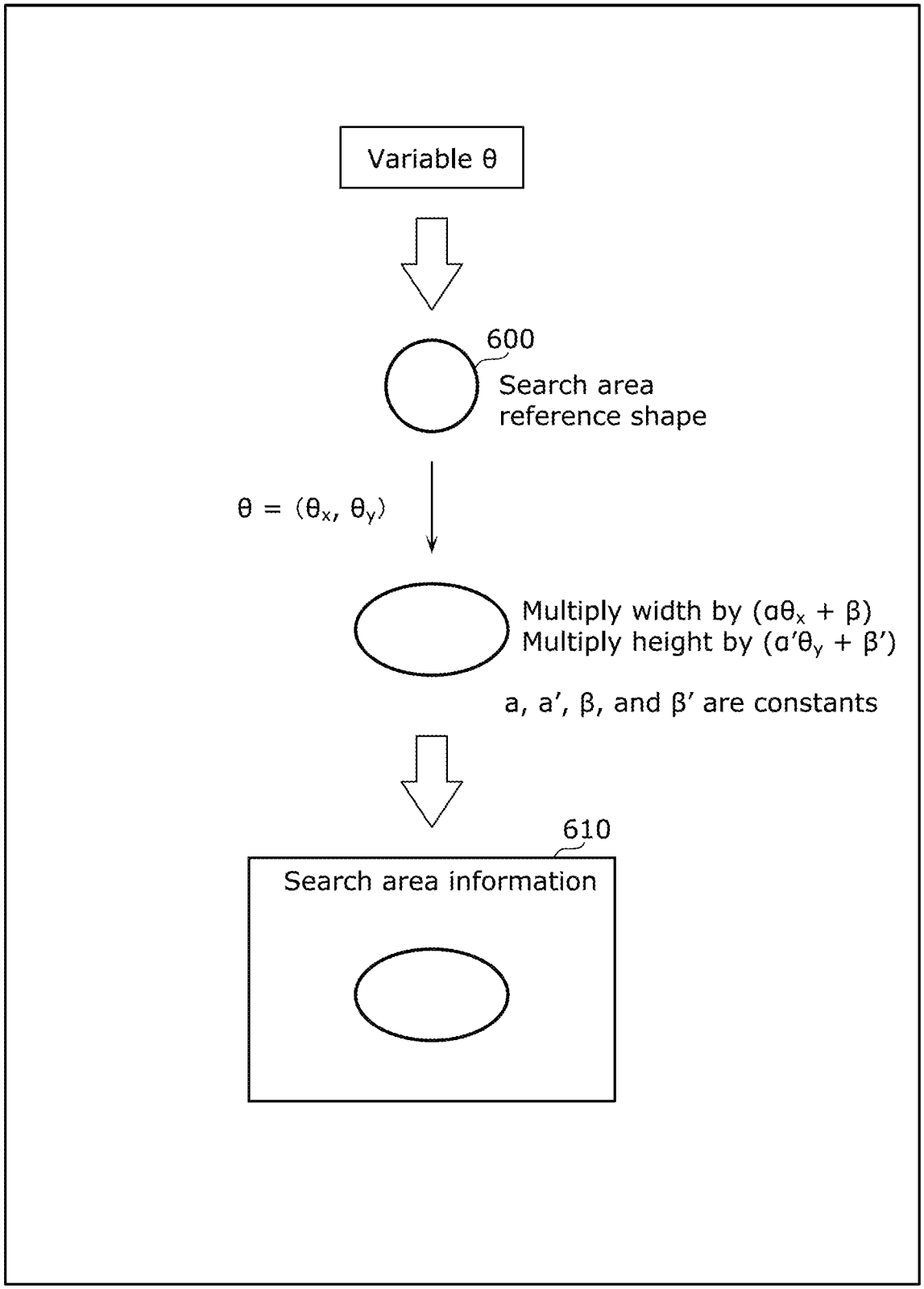
FIG. 17 is a schematic diagram for describing details of calibration processing according to Embodiment 2.

In the present embodiment, the search area information is, for example, as illustrated in FIG. 17, information for restricting candidates for feature points to be associated in the feature point matching, and is calculated by: changing search area reference shape 600 based on the plurality of items of second parameter information; and determining image areas which are in paired images 520 and 540 among the plurality of images and which correspond to each other in the three-dimensional space. Specifically, search window generation circuit 302d extracts, based on the plurality of items of second parameter information, a variable or a vector that represents a difference between the paired images in the way the images look in the horizontal direction, the vertical direction, or both between the paired images, calculates a candidate for a search area that increases in horizontal length with an increase in difference in the horizontal direction, calculates a search area for each of the paired images, and generates search area information 610 including the search areas calculated for the paired images.

Figure 18:
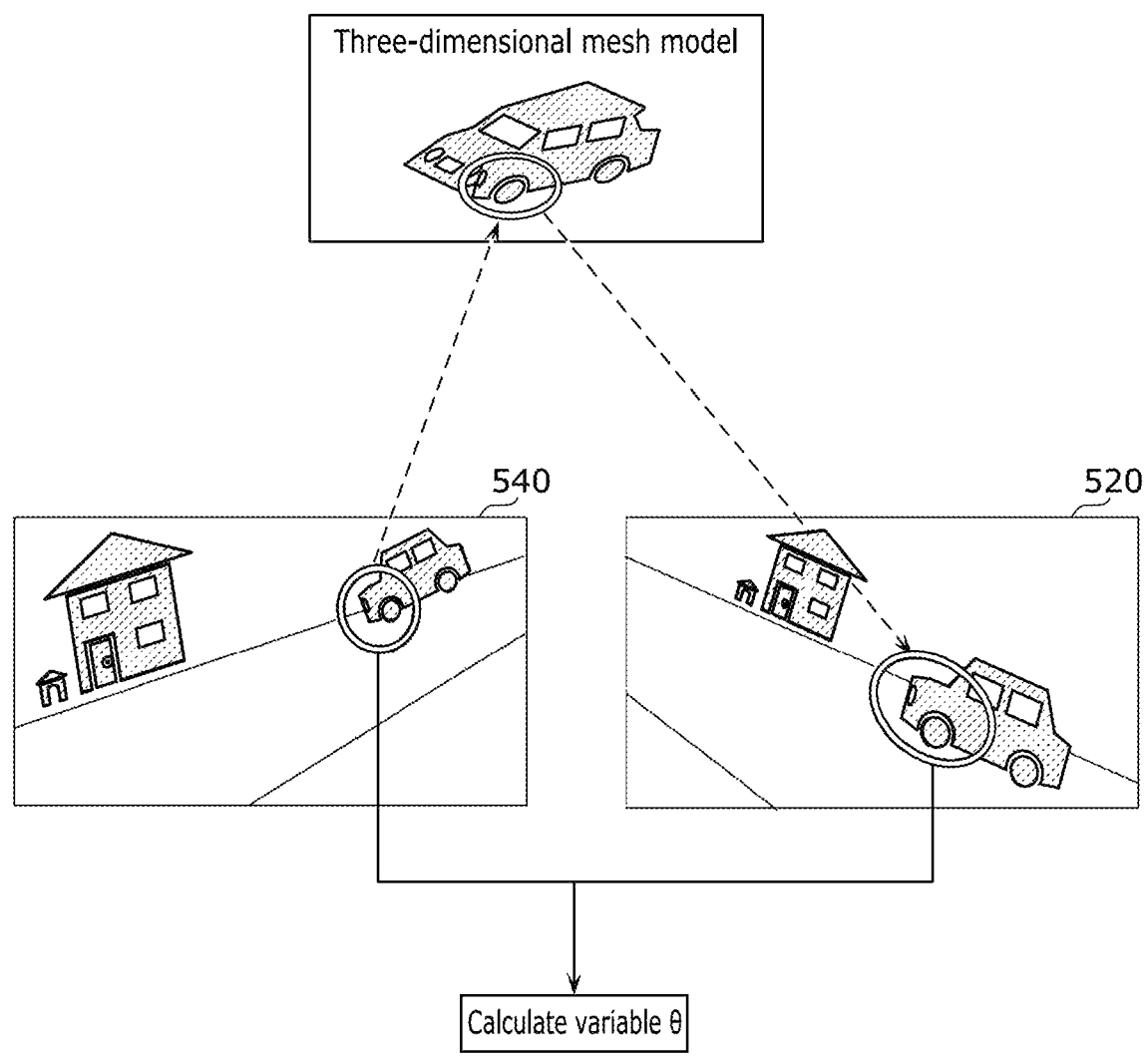
FIG. 18 is a schematic diagram for describing details of calibration processing according to Embodiment 2.

For example, as illustrated in FIG. 18, search window generation circuit 302d extracts vector θ that represents the difference in each of the horizontal direction and the vertical direction, and multiplies the width by $(\alpha\theta_x+\beta)$ and the height by $(\alpha'\theta_y+\beta')$, where $\theta_x$ denotes the horizontal component and $\theta_y$ denotes the vertical component. Each of $\alpha$, $\alpha'$, $\beta$, and $\beta'$ is any given constant greater than or equal to 0. At this time, search window generation circuit 302d performs calculation in a manner that the values of horizontal component $\theta_x$ and vertical component $\theta_y$ increase in proportion to the degree of difference between the paired images in the way the images look in each direction. By doing so, search window generation circuit 302d extracts a search area that increases in horizontal length with an increase in value of $\theta_x$, and extracts a search area that increases in vertical length with an increase in value of $\theta_y$.

Note that the variable representing a difference between the paired images in the way the images look may include one value, or may include a plurality of values. For example, using the feature points that extraction circuit 302e has extracted before search window generation circuit 302d operates, search window generation circuit 302d may extract a variable that includes as many values as the number of feature points, and may determine as many search areas as the number of feature points. Further, search window generation circuit 302d may determine as many search areas as the number of clusters obtained as a result of clustering feature points based on the positions according to the image coordinates.

As in Embodiment 1, search window generation circuit 302d may calculate the search window information to extract at least one feature amount patch. Search window generation circuit 302d may calculate, simultaneously, the search window information to extract at least one feature amount patch and the search area information for restricting the candidates for feature points to be associated in the feature point matching, or may calculate the search window information and the search area information at different times. Note that search window generation circuit 302d need not necessarily calculate the search window information to extract at least one feature amount patch.

Also, extraction circuit 302e may extract feature points using a patch of a fixed size or a patch resized based on the orientation information and/or the scale information of a keypoint.

Using the search area information generated by search window generation circuit 302d, matching calculation circuit 302f narrows down the plurality of feature points extracted to candidate feature points to be matched in feature point matching, and performs the feature point matching between the plurality of images using the candidate feature points. Narrowing down to the candidate feature points is processing of restricting candidate feature points to be associated, and is to restrict combinations of feature points to be matched to feature points included in corresponding search areas based on the search area information corresponding to the paired images.

Figure 19:
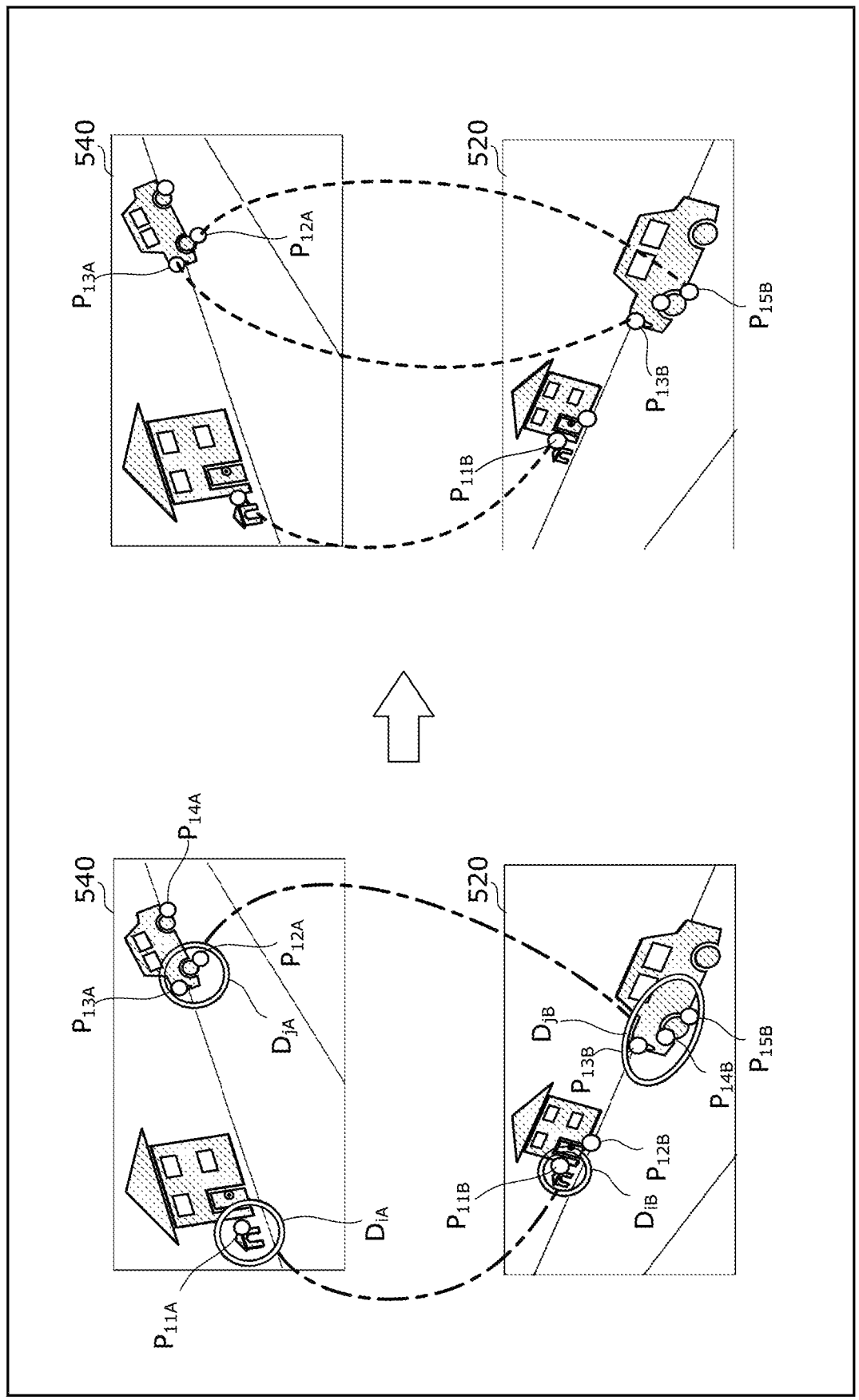
FIG. 19 is a schematic diagram for describing details of calibration processing according to Embodiment 2.

For example, as illustrated in FIG. 19, the feature point matching is performed by making an association only on the combination of feature point $P_{11A}$ located in search area $D_{iA}$ surrounded by a circle in image 540 and feature point $P_{11B}$ which is located in search area $D_{iB}$ surrounded by an ellipse in image 520 and indicates a close position in the three-dimensional space, and similarly by making an association only on the combination of feature points $P_{12A}$ and $P_{13A}$ located in search area $D_{jA}$ and feature points $P_{13B}$, $P_{14B}$, and $P_{15B}$ located in search area $D_{jB}$. In other words, first search area $D_{jA}$ in image 540 included in the plurality of images and second search area $D_{jB}$ in image 520 included in the plurality of images correspond to an area in the three-dimensional space, and first search area $D_{jA}$ in image 540 and second search area $D_{jB}$ in image 520 correspond to another area in the three-dimensional space. Matching calculation circuit 302f narrows down to, as the candidate feature points to be matched in the feature point matching, first feature point $P_{11A}$ included in first search area $D_{iA}$ and second feature point $P_{11B}$ included in second search area $D_{iB}$. Here, first search area $D_{iA}$ and second search area $D_{iB}$ are areas that correspond to a common area in the three-dimensional space. Matching calculation circuit 302f then performs the feature point matching using first feature point $P_{11A}$ and second feature point $P_{11B}$. Likewise, matching calculation circuit 302f narrows down to, as the candidate feature points to be matched in the feature point matching, first feature points $P_{12A}$ and $P_{13A}$ included in first search area $D_{jA}$ and second feature points $P_{13B}$, $P_{14B}$, and $P_{15B}$ included in second search area $D_{jB}$. Here, first search area $D_{jA}$ and second search area $D_{jB}$ are areas that correspond to a common area in the three-dimensional space. Matching calculation circuit 302f then performs the feature point matching using first feature points $P_{12A}$ and $P_{13A}$ and second feature points $P_{13B}$, $P_{14B}$, and $P_{15B}$.

Matching calculation circuit 302f does not perform the feature point matching using first feature point $P_{11A}$ and feature points other than second feature point $P_{11B}$ in image 520. Likewise, matching calculation circuit 302f does not perform the feature point matching using first feature points $P_{12A}$ and $P_{13A}$ and feature points other than second feature points $P_{13B}$, $P_{14B}$, and $P_{15B}$ in image 520. Likewise, matching calculation circuit 302f does not perform the feature point matching using second feature point $P_{11B}$ and feature points other than first feature point $P_{11A}$ in image 540. Likewise, matching calculation circuit 302f does not perform the feature point matching using second feature points $P_{13B}$, $P_{14B}$, and $P_{15B}$ and feature points other than first feature points $P_{12A}$ and $P_{13A}$ in image 540.

By performing the feature point matching in the manner described above, matching results can be obtained efficiently and accurately. It is effective for associating feature points especially when there are feature points on similar patterns such as a front wheel and a back wheel of an automobile; for example, feature points $P_{12A}$ and $P_{14A}$ in image 540.

As described above, in the present embodiment, calibration apparatus 300A calibrates camera parameters of cameras 100 included in imaging apparatuses 10a to 10n that are disposed in different positions and capture a common three-dimensional space. The calibration includes: obtaining images captured by the plurality of imaging apparatuses; obtaining items of first parameter information that are related to parameters of the plurality of imaging apparatuses; estimating three-dimensional information in the common three-dimensional space based on the images obtained and the items of first parameter information obtained; for each of the images obtained, generating search area information indicating at least one search area for restricting combinations of feature points to be matched, based on the three-dimensional information estimated and the first parameters obtained; extracting a plurality of feature points for each of the images; by using the search area information generated, narrowing down the plurality of feature points extracted to candidate feature points to be matched in feature point matching, and performing the feature point matching between the images using the candidate feature points; and calibrating the parameters of the plurality of imaging apparatuses based on a plurality of matching results obtained by the feature point matching.

Variation 1

In the above embodiments, search window generation circuit 302d calculates the shape of a search window by changing the search window reference shape based on the parameter information, but the present disclosure is not limited to this. Search window generation circuit 302d may perform image processing on image 540 included in the images obtained by image obtaining circuit 302a so as to recognize the shape of an object, and cut out from image 540 an area having the shape of the recognized object. That is to say, for each of the images obtained, search window generation circuit 302d recognizes the shape of an object in the image, and generates a search window surrounding the shape.

Figure 20:
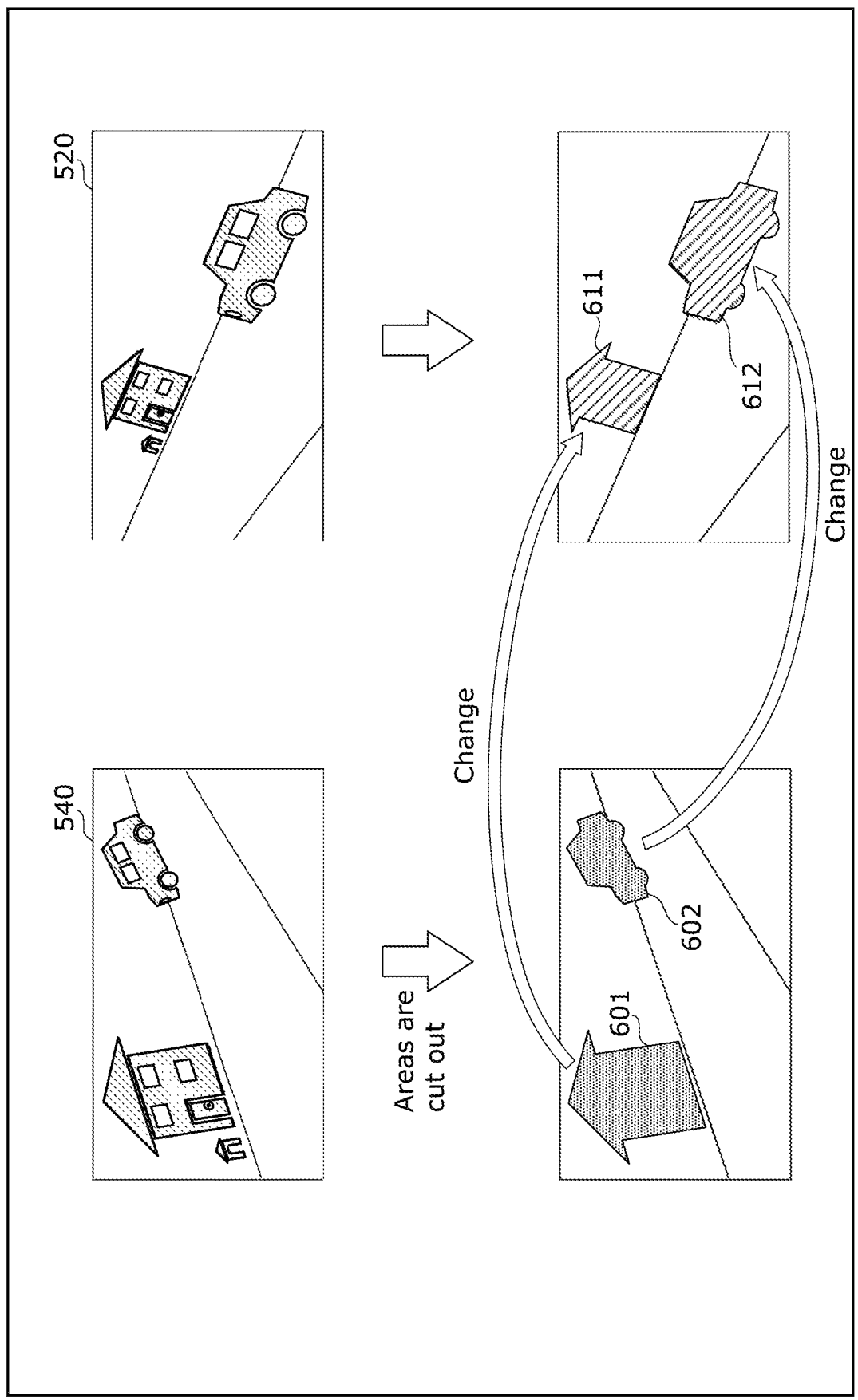
FIG. 20 is a diagram for describing search window generation processing according to Variation 1.

In the example illustrated in FIG. 20, search window generation circuit 302d recognizes, in image 540, area 601 having a shape in which a house is captured and area 602 having a shape in which a vehicle is captured, and cuts out recognized areas 601 and 602 from image 540. The shapes of areas 601 and 602 may be extracted in units of pixels in image 540 as illustrated in FIG. 20, or may be a predetermined shape surrounding an object recognized. Example of the predetermined shape include a quadrangle, a circle, an ellipse, etc. The recognition of the object shape is performed by, for example, machine learning and pattern recognition, but the means for the recognition of the object shape is not limited to these.

Next, search window generation circuit 302d changes the shapes, sizes, and positions of areas 601 and 602 cut out from image 540 to obtain areas 611 and 612 having shapes, sizes, and positions appropriate for image 520, using the parameter information of the camera that has captured image 540 and the parameter information of the camera that has captured image 520. Subsequently, search window generation circuit 302d applies areas 611 and 612, which have been obtained by the above change, to image 520 as search windows. In such a manner, search window generation circuit 302d may generate a pair of search windows, i.e., areas 601 and 611, and a pair of search windows, i.e., areas 602 and 612, that are associated between image 540 and image 520.

Variation 2

Figure 21:
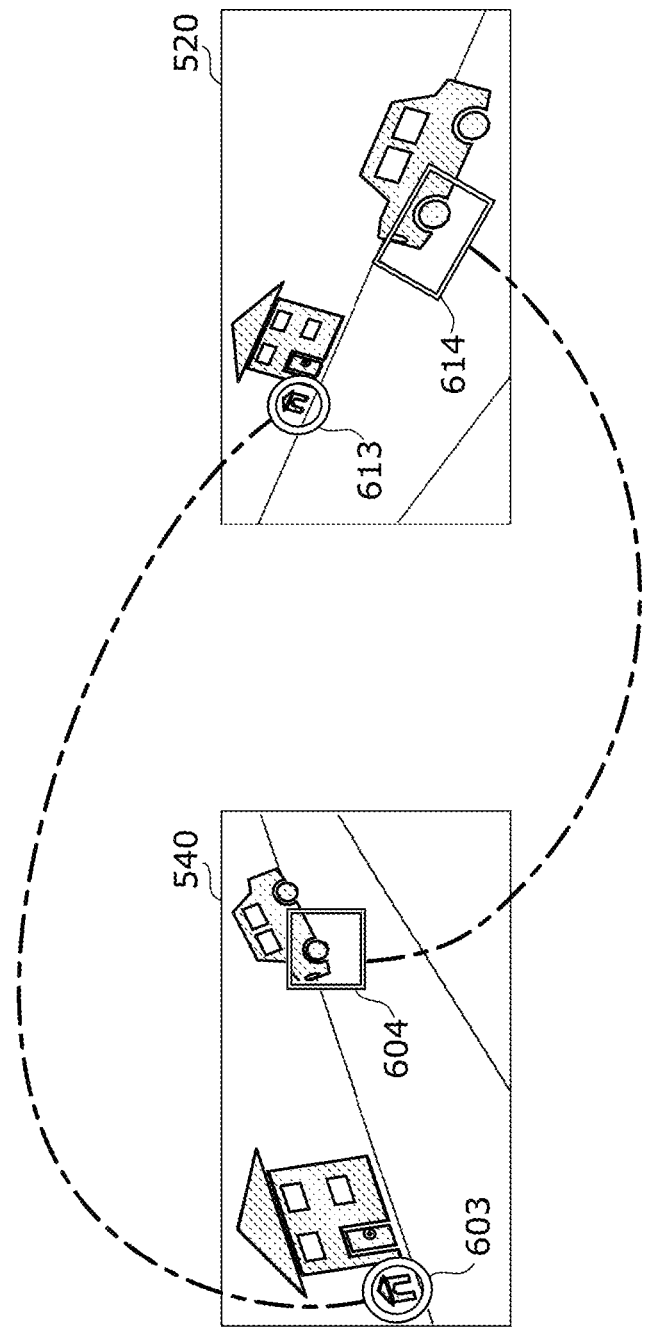
FIG. 21 is a diagram for describing search window generation processing according to Variation 2.

In the above embodiments, search window generation circuit 302d may generate a search window having a different shape for each area of each image. For example, as illustrated in FIG. 21, search window generation circuit 302d may generate circular or elliptical search windows 603 and 613 when the size (surface area) of the areas to which search windows are to be applied is less than a predetermined size, and generate quadrilateral search windows 604 and 614 when the size of the areas to which search windows are to be applied is greater than the predetermined size. In such a manner, search window generation circuit 302d may generate search window 603 and search window 604 having different shapes as search windows to be applied to image 540, and generate search window 613 and search window 614 having different shapes as search windows to be applied to image 520.

Variation 3

Figure 22:
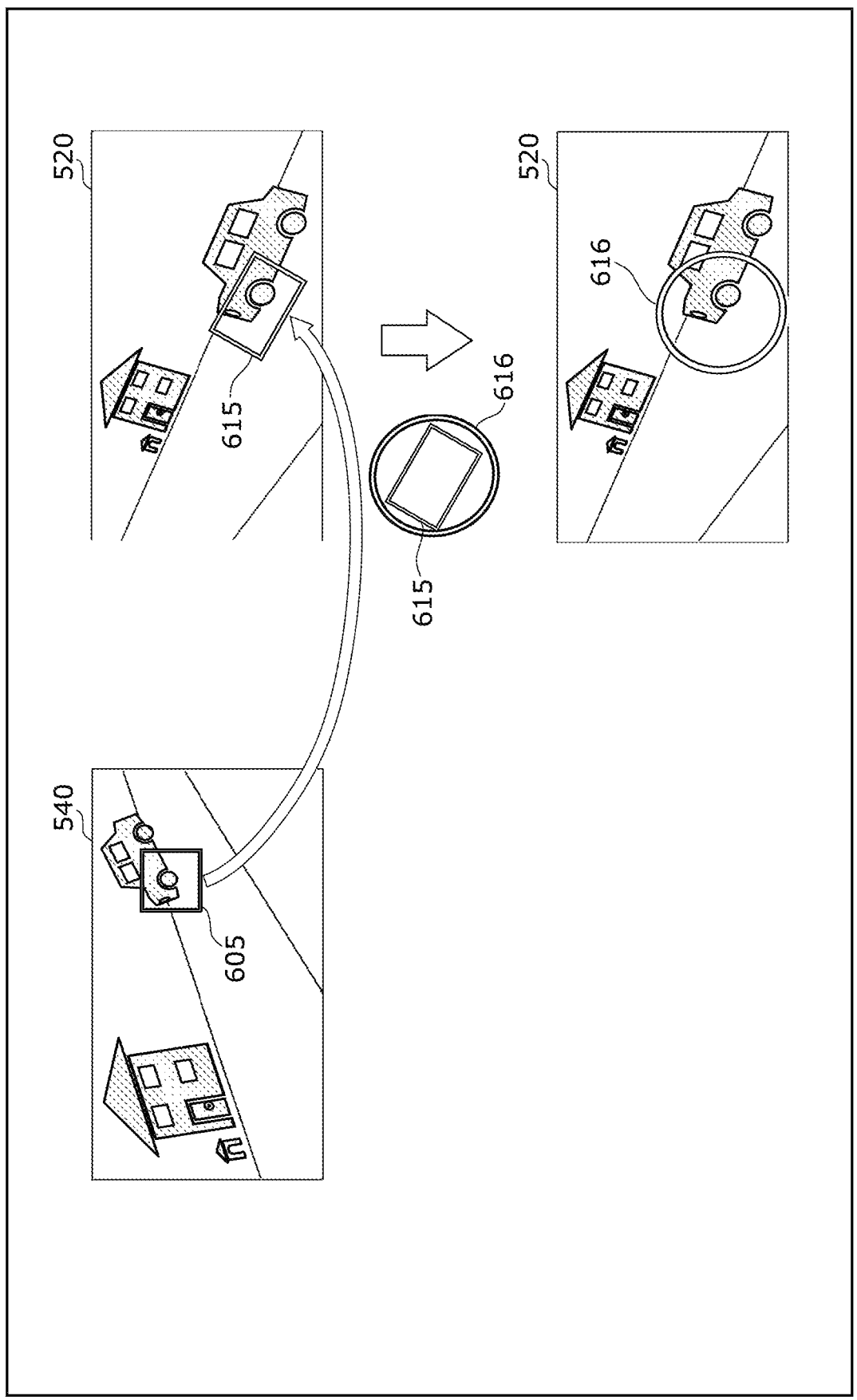
FIG. 22 is a diagram for describing search window generation processing according to Variation 3.

In the above embodiments, search window generation circuit 302d may change, as illustrated in FIG. 22, the shape of at least one of search window 605 or search window 615 after generating search windows 605 and 615 for images 540 and 520, respectively. For example, search window generation circuit 302d may change quadrilateral search window 615 to circular search window 616 as the search window to be applied to image 520. Search window 616 is, for example, a circumcircle of quadrilateral search window 615. When the degree of similarity between one feature amount patch extracted from image 540 using search window 605 and another feature amount patch extracted from image 520 using search window 615 is less than a predetermined degree of similarity, search window generation circuit 302d may change search window 615 to search window 616. Subsequently, the degree of similarity between the feature amount patch extracted from image 540 using search window 605 and a feature amount patch extracted from image 520 using changed search window 616 may be calculated again.

Note that instead of changing the shape of search window 615 which has been generated, search window generation circuit 302d may increase the size of search window 615. Further, search window generation circuit 302d may change search window 615 according to the accuracy of the parameter information of the camera that has captured image 540 and the parameter information of the camera that has captured image 520. For example, when the parameter information is based on a difference in position orientation according to a person's visual inspection as illustrated in FIG. 7A, the accuracy of the parameter information is lower than a predetermined accuracy, and thus search window generation circuit 302d may change search window 615 to search window 616 as the search window to be used for searching for similar feature points. On the other hand, when the parameter information is based on a result of calibration performed in the past as illustrated in FIG. 7B, the accuracy of the parameter information is higher than the predetermined accuracy, and thus search window generation circuit 302d may determine search window 615 as the search window to be used for searching for similar feature points, that is, search window 615 is not changed to search window 616.

The present disclosure is not limited to the above embodiments, and various modifications or alterations are possible within the scope of the present disclosure.

Note that each of the elements in the above embodiments may be configured in the form of an exclusive hardware product, or may be implemented by executing a software program suitable for the element. Each of the elements may be implemented by means of a program executor, such as a CPU or a processor, reading and executing the software program recorded on a recording medium such as a hard disk or a semiconductor memory. Here, the software program for implementing the imaging system according to each of the above embodiments is a program described below.

The program causes a computer to execute a calibration method of calibrating, using a processor, parameters of a plurality of imaging apparatuses that are disposed in different positions and capture a common three-dimensional space, the calibration method including: obtaining images captured by the plurality of imaging apparatuses; obtaining items of parameter information that are related to parameters of the plurality of imaging apparatuses; for each of the images obtained, generating search window information indicating at least one search window to extract a plurality of feature points of the image using the items of parameter information obtained; for each of the images obtained, extracting the plurality of feature points using the search window information generated; performing feature point matching between the images using the plurality of feature points extracted for each of the images; and calibrating the parameters based on a plurality of matching results obtained by the feature point matching.

The program causes a computer to execute a calibration method of calibrating parameters of a plurality of imaging apparatuses that are disposed in different positions and capture a common three-dimensional space, the calibration method including: obtaining images captured by the plurality of imaging apparatuses; obtaining items of first parameter information indicating parameters of the plurality of imaging apparatuses; estimating three-dimensional information in the common three-dimensional space based on the images obtained and the items of first parameter information obtained; for each of the images obtained, generating search area information indicating at least one search area for restricting combinations of feature points to be matched, based on the three-dimensional information estimated and the items of first parameter information obtained; extracting a plurality of feature points for each of the images; by using the search area information generated, narrowing down the plurality of feature points extracted to candidate feature points to be matched in feature point matching, and performing the feature point matching between the images using the candidate feature points; and calibrating the parameters of the plurality of imaging apparatuses based on a plurality of matching results obtained by the feature point matching.

Although a calibration system and a calibration method according to one or more aspects of the present disclosure have been described above based on some exemplary embodiments, the present disclosure is not limited to these embodiments. Various modifications to these embodiments conceivable to those skilled in the art, as well as embodiments resulting from combinations of elements in different embodiments may be included within the scope of one or more aspects of the present disclosure, so long as they do not depart from the essence of the present disclosure.

INDUSTRIAL APPLICABILITY

The present disclosure is useful as a calibration method, a calibration apparatus, etc., that are capable of accurately calibrating parameters of cameras included in a plurality of imaging apparatuses disposed in different positions.

The invention claimed is:

1. A calibration method of calibrating, using a processor, parameters of a plurality of imaging apparatuses that capture a common three-dimensional space, the calibration method comprising:
obtaining images captured by the plurality of imaging apparatuses;
obtaining the parameters of the plurality of imaging apparatuses;
for each of the images obtained, generating at least one search window using the parameter of one of the plurality of imaging apparatuses that has obtained the image and the parameter of another imaging apparatus that has not obtained the image, to extract a plurality of feature points of the image;
for each of the images obtained, extracting the plurality of feature points from an inside of the at least one search window generated;
performing feature point matching between the images using the plurality of feature points extracted for each of the images; and
calibrating the parameters based on a plurality of matching results obtained by the feature point matching,
wherein each of the parameters indicates a position and orientation of a corresponding imaging apparatus that corresponds to the parameter.

2. The calibration method according to claim 1, wherein each of the parameters is obtained by calibration performed on the corresponding imaging apparatus at a past point in time, and includes a camera label that identifies the corresponding imaging apparatus.

3. The calibration method according to claim 1, wherein each of the parameters is related to a relative position and orientation of the corresponding imaging apparatus relative to an other imaging apparatus, and includes a camera label that identifies the corresponding imaging apparatus.

4. The calibration method according to claim 1, wherein each of the parameters indicates a distance from the corresponding imaging apparatus to a given point in the common three-dimensional space, and includes a camera label that identifies the corresponding imaging apparatus.

5. The calibration method according to claim 1, wherein the generating of the at least one search window includes calculating, based on the parameters, a search window having a shape that increases in length in a direction perpendicular to an arrangement direction of one imaging apparatus that has captured the image and an other imaging apparatus with an increase in difference in position and orientation between the one imaging apparatus and the other imaging apparatus in the arrangement direction.

6. The calibration method according to claim 5, wherein the extracting of the plurality of feature points includes
(i) detecting a plurality of keypoints from the image, and
(ii) for each of the plurality of keypoints detected, (ii-i) extracting at least one feature amount patch by placing the at least one search window on the image such that a center of the at least one search window is located on the keypoint, and (ii-ii) extracting a feature point by calculating, as a feature amount, a feature distribution of each of the at least one feature amount patch extracted for the keypoint and writing the feature distribution in the keypoint.

7. The calibration method according to claim 1, further comprising changing a shape of the at least one search window according to the parameters of a plurality of imaging apparatuses.

8. A calibration apparatus that calibrates a plurality of parameters of a plurality of imaging apparatuses that capture a common three-dimensional space, the calibration apparatus comprising:
an image obtaining circuit that obtains images captured by the plurality of imaging apparatuses;
a parameter obtaining circuit that obtains parameters of the plurality of imaging apparatuses;
a search window generation circuit that, for each of the images obtained by the image obtaining circuit, generates at least one search window using the parameter of one of the plurality of imaging apparatuses that has obtained the image and the parameter of another imaging apparatus that has not obtained the image, to extract a plurality of feature points of the image;

an extraction circuit that, for each of the images obtained by the image obtaining circuit, extracts the plurality of feature points from an inside of the at least one search window generated by the search window generation circuit;

a matching calculation circuit that performs feature point matching between the images using the plurality of feature points extracted by the extraction circuit for each of the images; and a calibration circuit that calibrates the parameters based on a plurality of matching results obtained by the feature point matching performed by the matching calculation circuit, wherein each of the parameters indicates a position and orientation of a corresponding imaging apparatus that corresponds to the parameter.

9. The calibration apparatus according to claim 8, wherein the search window generation circuit changes a shape of the at least one search window according to the parameters of a plurality of imaging apparatuses.

* * * * *